US007073172B2

(12) United States Patent
Chamberlain

(10) Patent No.: US 7,073,172 B2
(45) Date of Patent: Jul. 4, 2006

(54) ON DEMAND PATCHING OF APPLICATIONS VIA SOFTWARE IMPLEMENTATION INSTALLER MECHANISM

(75) Inventor: Benjamin C. Chamberlain, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 614 days.

(21) Appl. No.: 10/228,770

(22) Filed: Aug. 27, 2002

(65) Prior Publication Data

US 2003/0145317 A1    Jul. 31, 2003

Related U.S. Application Data

(63) Continuation of application No. 09/261,732, filed on Mar. 3, 1999, which is a continuation-in-part of application No. 09/158,021, filed on Sep. 21, 1998, now Pat. No. 6,418,554.

(51) Int. Cl.
G06F 9/445     (2006.01)
(52) U.S. Cl. ............... 717/169; 717/172; 717/175; 717/176
(58) Field of Classification Search ........ 717/168–178; 714/38
See application file for complete search history.

(56) References Cited

U.S. PATENT DOCUMENTS

| 5,421,009 | A | 5/1995 | Platt |
| 5,473,772 | A | 12/1995 | Halliwell et al. |
| 5,535,326 | A | 7/1996 | Baskey et al. |
| 5,555,416 | A | 9/1996 | Owens et al. |
| 5,625,823 | A | 4/1997 | Debenedictis et al. |
| 5,630,076 | A | 5/1997 | Saulpaugh et al. |
| 5,644,766 | A | 7/1997 | Coy et al. |
| 5,655,081 | A | 8/1997 | Bonnell et al. |
| 5,659,547 | A | 8/1997 | Scarr et al. |
| 5,692,129 | A | 11/1997 | Sonderegger et al. |
| 5,732,266 | A | 3/1998 | Moore et al. |
| 5,732,275 | A | 3/1998 | Kullick et al. |
| 5,742,829 | A | 4/1998 | Davis et al. |
| 5,752,042 | A | 5/1998 | Cole et al. |
| 5,764,992 | A | 6/1998 | Kullick et al. |
| 5,778,234 | A | 7/1998 | Hecht et al. |
| 5,784,612 | A | 7/1998 | Crane et al. |
| 5,790,664 | A | 8/1998 | Coley et al. |

(Continued)

OTHER PUBLICATIONS

Anonymous, "ADSTAR Distributed Storage Manager Basic Concepts", *IBM Storage Software*, http://www.storage.ibm.com/software/adsm/adbasics.htm pp. 1-8, (Oct. 31, 1997), printed Nov. 3, 1997.

(Continued)

*Primary Examiner*—Chameli C. Das
*Assistant Examiner*—Chuck Kendall
(74) *Attorney, Agent, or Firm*—Law Offices of Albert S. Michalik, PLLC

(57) ABSTRACT

A method and mechanism for automatically patching software implementations such as applications as they are installed from an external source. A patch program is run for a software implementation that is advertised as available, or is otherwise available, though not yet installed (or fully installed). The mechanism maintains the patch information for that software implementation. Whenever the software implementation is installed, the mechanism determines that the software implementation has the patch information maintained therefor. The mechanism automatically applies the patch as part of the on-demand installation process. The patch may change the files, the values of registry entries and/or the installation logic associated with the software implementation.

33 Claims, 20 Drawing Sheets

U.S. PATENT DOCUMENTS

| | | | |
|---|---|---|---|
| 5,790,856 A | 8/1998 | Lillich | |
| 5,796,967 A | 8/1998 | Filepp et al. | |
| 5,805,897 A | 9/1998 | Glowny | |
| 5,835,911 A | 11/1998 | Nakagawa et al. | |
| 5,859,969 A | 1/1999 | Oki et al. | |
| 5,859,978 A | 1/1999 | Sonderegger et al. | |
| 5,867,713 A | 2/1999 | Shrader et al. | |
| 5,867,714 A | 2/1999 | Todd et al. | |
| 5,870,762 A | 2/1999 | Lee | |
| 5,897,640 A | 4/1999 | Veghte et al. | |
| 5,925,127 A | 7/1999 | Ahmad | |
| 5,930,513 A | 7/1999 | Taylor | |
| 5,933,647 A | 8/1999 | Aronberg et al. | |
| 5,954,827 A | 9/1999 | Frank et al. | |
| 5,960,204 A | 9/1999 | Yinger et al. | |
| 5,978,590 A | 11/1999 | Imai et al. | |
| 5,987,504 A | 11/1999 | Toga | |
| 5,995,756 A | 11/1999 | Hermann | |
| 5,999,740 A | 12/1999 | Rowley | |
| 6,006,034 A | 12/1999 | Heath et al. | |
| 6,006,035 A | 12/1999 | Nabahi | |
| 6,009,274 A | 12/1999 | Fletcher et al. | |
| 6,009,401 A | 12/1999 | Horstmann | |
| 6,021,438 A | 2/2000 | Duvvoori et al. | |
| 6,023,586 A | 2/2000 | Gaisford et al. | |
| 6,029,147 A | 2/2000 | Horadan et al. | |
| 6,041,333 A | 3/2000 | Bretschneider et al. | |
| 6,067,582 A | 5/2000 | Smith et al. | |
| 6,131,192 A | 10/2000 | Henry | |
| 6,151,643 A | 11/2000 | Cheng et al. | |
| 6,151,708 A | 11/2000 | Pedrizetti et al. | |
| 6,161,218 A | 12/2000 | Taylor | |
| 6,167,567 A * | 12/2000 | Chiles et al. | 717/173 |
| 6,199,204 B1 | 3/2001 | Donohue | |
| 6,202,207 B1 | 3/2001 | Donohue | |
| 6,212,536 B1 | 4/2001 | Klassen et al. | |
| 6,286,138 B1 * | 9/2001 | Purcell | 717/143 |
| 6,314,565 B1 | 11/2001 | Kenner et al. | |

OTHER PUBLICATIONS

"Automating Microsoft Transaction Server Client Installation," Microsoft Corporation, URL:wysiwyg://MAIN.PRODINFO.6/http://msdn.mi...m/library/backgrnd/html/msdn_install.html (Jun. 1997), printed Feb. 29, 2000.

"Seagate Enterprise Management Software-East Announces Release of Desktop Management Suite; Best-of-Breed Point Solutions Integrated to Provide Heterogenous LAN Management," *Business Wire*, p. 04020056 (Apr. 2, 1996).

Dunigan et al., *MCSE Training Guide: Windows NT Workstation 4*, New Riders Publishing, pp. 28-32, 402-405, 486-492 (1997).

Green, "Windows Apps Need To Be Aware of Install Methods", *Network World*, p. 45 (Nov. 1994).

Jones, Michael B., "The Microsoft Interactive System: An Experience Report," *Technical Report MSR-TR-97-18*, pp. 1-20, http://research.microsoft.com/mjb/papers/mitv/tr-97-18.htm (Jul. 1997), printed Sep. 4, 2001.

Kelly, Mike, "Gain Control of Application Setup and Maintenance with the New Windows Installer," *Microsoft Systems Journal*, pp. 15-18, 20-23, 26-27 (Sep. 1998).

Lang, Jay., "IBM Bolsters Windows NT Reliability With Tools Suite," *Information Week*, p. A6ff (Jul. 20, 1998).

McKinney et al., "Win Tips Windows 9x", *Windows Magazine*, pp. 255-258 (Aug. 1998).

Mc Nutt, Administering X Sites, *Unix Review*, pp. 45ff (Jul. 1992).

Methvin, David, "Problems? In Win98?", *Windows Magazine*, pp. 224ff (Oct. 1998).

Spanbauer, Scott, "Internet Explorer 4.0, Problem Child", *PC World*, p. 53 (Jan. 1998).

\* cited by examiner

ON DEMAND PATCHING OF APPLICATIONS VIA SOFTWARE IMPLEMENTATION INSTALLER MECHANISM

The present application is a continuation of U.S. patent application Ser. No. 09/261,732, filed on Mar. 3, 1999, which is a continuation-in-part of U.S. patent application Ser. No. 09/158,021 entitled "Software Implementation Installer Mechanism," filed on Sep. 21, 1998, now U.S. Pat. No. 6,418,554.

RELATED APPLICATIONS

This application is related to the following U.S. Patent Applications and Patents, all of which are assigned to the same assignee as the present application:

"Use of Relational Databases for Software Installation"—Ser. No. 09/158,125, U.S. Pat. No. 6,237,144;

"System and Method for Repairing a Damaged Application"—Ser. No. 09/158,126, U.S. Pat. No. 6,397,381;

"Method and System for Restoring a Computer to its Original State After an Unsuccessful Installation Attempt"—Ser. No. 09/158,124, U.S. Pat. No. 6,363,499;

"A Method for Categorizing and Installing Selected Software Components"—Ser. No. 09/157,695, U.S. Pat. No. 6,370, 686;

"System and Method for Managing Locations of Software Components Via a Source List"—Ser. No. 09/157,974, U.S. Pat. No. 6,269,377;

"Method for Optimizing the Installation of a Software Product onto a Target Computer System"—Ser. No. 09/157,853;

"Software Installation and Validation Using Custom Actions"—Ser. No. 09/157,776, U.S. Pat. No. 6,378, 127;

"Internal Database Validation"—Ser. No. 09/157,828, U.S. Pat. No. 6,389,414;

"Management of Non-persistent Data in a Persistent Database"—Ser. No. 09/157,883;

"Method and System for Advertising Applications Ser. No. 09/158,967, U.S. Pat. No. 6,345,386;

"Method and System for On-Demand Installation of Software Implementations"—Ser. No. 09/158,021, U.S. Pat. No. 6,418,554;

"Method and System for Assigning and Publishing Applications"—Ser. No. 09/158,968 and "Class Store Schema"—Ser. No. 09/158,023, U.S. Pat. No. 6,389,589.

FIELD OF THE INVENTION

The invention relates generally to computer systems, and more particularly to an improved method and system for patching software applications installed on computer systems.

BACKGROUND OF THE INVENTION

In contemporary enterprises such as a corporation, one of the duties of a network administrator is to set up and maintain the corporation's computers so as to make employees more productive. Lost productivity at employees' computer desktops is a major cost for corporations, often resulting from user errors such as inadvertently removing some or all of a needed application or using an old application rather than an enterprise-specified one that is improved, secure and/or compatible with others. Similarly, lost productivity often results from user errors such as removing or modifying other software implementations such as system configuration files, dynamic link libraries (DLLs), application files and object classes (e.g., COM objects) in ways that render the computer or applications unworkable. Productivity is also lost when a desktop is too complex, such as when the desktop has too many non-essential applications and offerings thereon. Much of the expense of administering distributed personal computer networks is spent at the desktop, performing tasks such as fixing the settings or reinstalling implementations that the user has incorrectly or inadvertently modified.

At the same time, an enterprise wants certain personnel to have access to various software implementations such as applications, while wanting other applications to be available to certain users for access if needed. For example, a corporate enterprise may declare a policy specifying that everyone in the company should use a particular electronic mail program, while in addition, those in the research department should be able to load a particular spreadsheet application if needed.

However, to implement such policy decisions, administrators or the like generally need to physically visit each workstation to load (or unload) the specified programs and other software implementations, adjust various system configurations, and so forth. In addition to initially setting the computers, the administrators must hope (or regularly check) that the users do not change the settings, however users regularly make modifications, leading to lost productivity. The administrator also needs to revisit the workstations to install new versions of implementations.

Such policies cause problems when multiple users share the same computer, since a policy instituted for one user of that computer may not be compatible with the policy for another. As can be readily appreciated, installing software implementations in an enterprise is a complex task that does not fit in well with existing systems and methods. In addition, installation for non-network users may also be improved.

Moreover, applications also sometimes have patches applied thereto. Patches are generally updates (e.g. fixes) that overwrite part of an application's code, append code to an application, change or add components (such as DLLs) used by an application and/or change application-related entries in the system registry. At present, patch installation mechanisms are essentially standalone products custom-built generally as an afterthought for the applications they are patching, and are independent from the original application installation mechanism.

As a result, patch installation mechanisms do not communicate with the original application installation mechanism, and are not aware of the installed state of an application from the original application installation mechanism's perspective. This presents a number of problems. For example, if the user is required to reinstall the original application, via its original installation mechanism, the patch is not automatically reapplied. Similarly, if the user installs a portion of a number of available applications, such as two applications of a five application suite, applies a patch written for the suite, and then later installs one or more of the formerly uninstalled applications, the patch will not be applied to the newly installed applications. It is thus up to the user to recognize the need to rerun the patch installation mechanism. However, unless the user is sophisticated enough and also remembers to check the installed version number against the patched version number, the user has no way of knowing that the patch, which should be applied, has not been applied. In short, present application patching technology has many shortcomings.

SUMMARY OF THE INVENTION

Briefly, the present invention provides a method and mechanism for automatically patching a software implementation (e.g., application program) on demand. An installer mechanism receives a patch and associates the patch with one or more software implementations. The software implementation may be installed, in which event the installer mechanism will patch the implementation, but may not yet be installed. When the installer mechanism receives a request to install such a software implementation, the installer installs the software implementation, recognizes that the software implementation has a patch associated therewith, and patches the software implementation. For example, the patch may change the files and/or the values of registry entries associated with the software implementation.

Because the patching is automatic following any installation of a software implementation having a patch associated therewith, the software implementation need not be installed when the patch application program is run. Moreover, because the patch is applied whenever an installation occurs, the patch is reapplied if part of the application is uninstalled and then reinstalled, if the application repairs its files, and/or if an application of a patched suite of applications that was not previously installed is later installed.

Other benefits and advantages will become apparent from the following detailed description when taken in conjunction with the drawings, in which:

DETAILED DESCRIPTION OF THE PREFERRED EMBODIMENT

Exemplary Operating Environment

Figure 1:
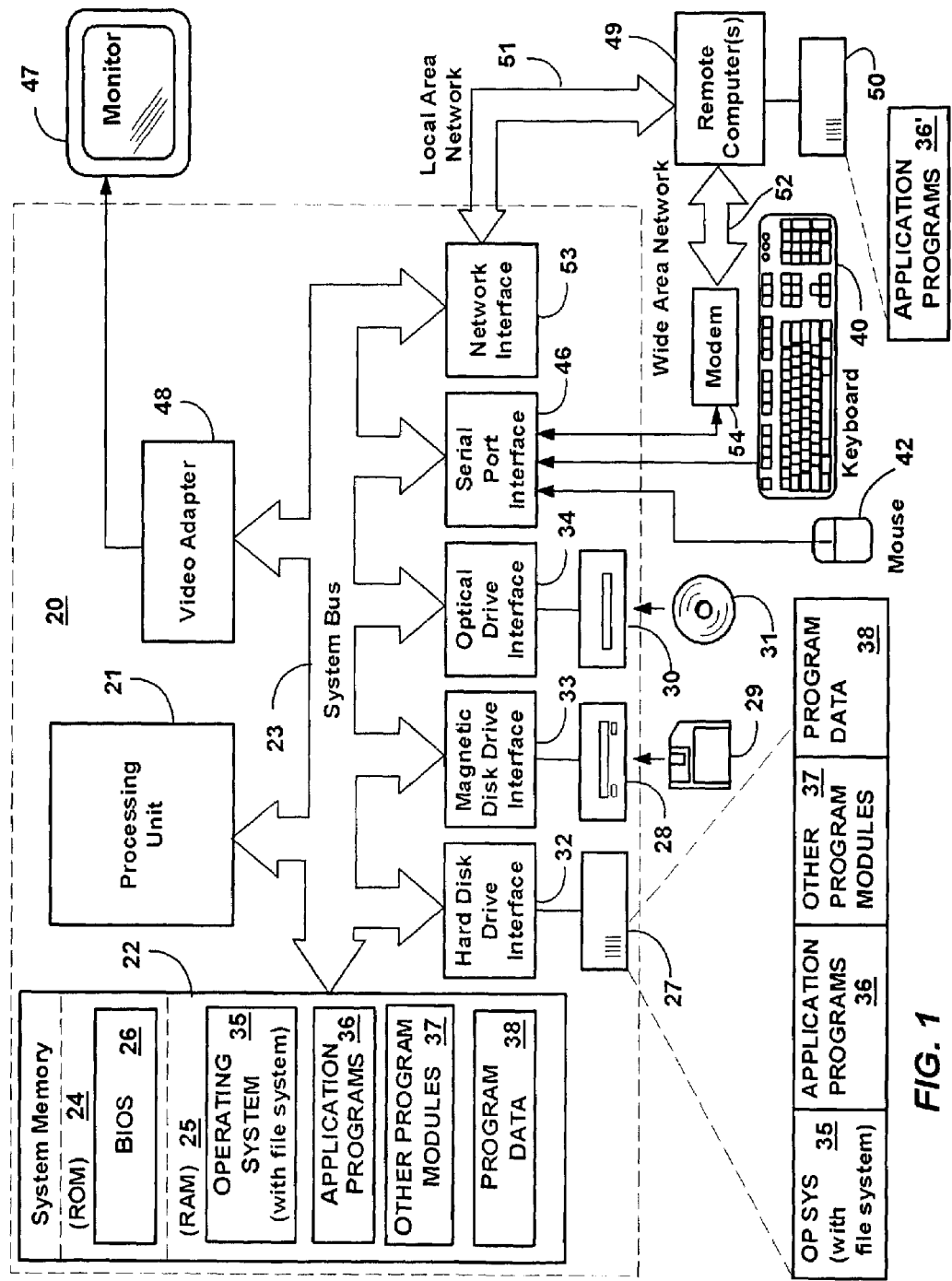
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows® 2000), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device.

It will be appreciated that the network connections shown are exemplary and other means of establishing a communications link between the computers may be used.

For purposes of the following description, a client workstation (e.g., $20_1$) may correspond to the computer system 20, while software implementations 60 such as applications or pieces thereof, (e.g., products, features and components as described below), objects and so on may reside on one or more of the remote computers 49. However as can be readily appreciated, no particular arrangement of the various files, interfaces, objects (classes), mechanisms, processes and so on described herein is necessary to the present invention. Indeed, as is understood in computing and networking in general, such files, interfaces, objects, mechanisms, processes and so, on may be combined, separated and/or distributed in virtually any number of ways among the various network devices.

Also, as will become apparent below, there is no requirement to limit on-demand installation to networks, as other implementations such as standalone users may benefit from the present invention. The on-demand installation of implementations may be performed by the present invention for any number of users in many types of environments, from a single standalone user to an enterprise-wide network of policy recipients, i.e., users and machines. Indeed, although a deployment scheme is able to trigger the installation mechanism remotely and efficiently, thus leveraging it for enterprise-wide deployment, it is understood that the concept of install on demand is valid outside the scope of application deployment. Notwithstanding, many aspects of the present invention will be described hereinafter with respect to network application deployment, since network application deployment benefits significantly from on-demand installation.

Figure 2:
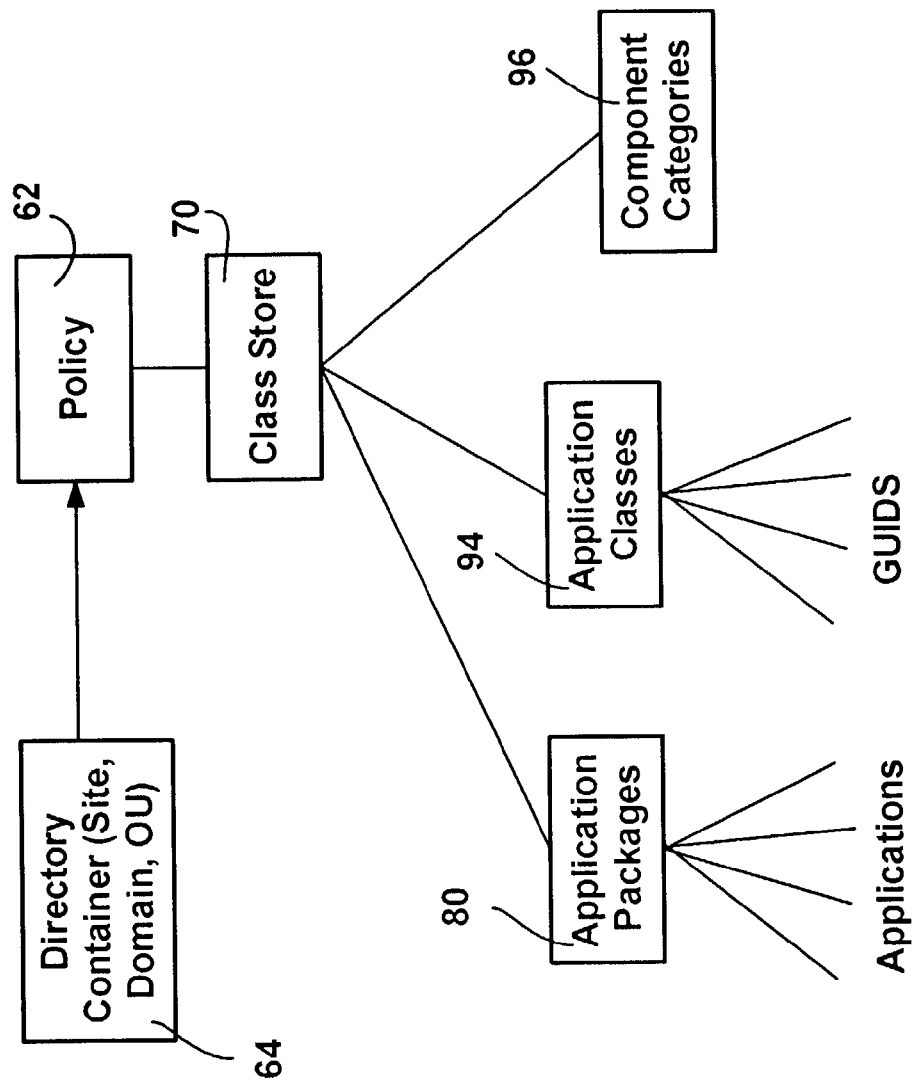
FIG. 2 is a diagram representing how various containers including a class store container are hierarchically organized under a policy object associated with a directory container.

In one embodiment, the present invention provides a method and system that facilitates deploying software implementations by automatically installing the software implementations throughout a computer network in a highly flexible, scalable, extensible and efficient manner. To this end, as shown in FIG. 2, the method and system leverage a highly flexible architecture wherein an administrator can tailor policies 62 to containers 64 (sites, domains, and organizational units of users and computers arranged in a hierarchical manner), by specifying one or more policies 62 therefor, such that the policy within an organization is centrally managed. Such group policies 62, including the prioritizing of multiple policies for policy recipients (e.g., users or machines) are described in U.S. patent application Ser. No. 09/134,805, entitled "System and Method for Implementing Group Policy," assigned to the assignee of the present invention and hereby incorporated by reference herein in its entirety.

Figure 3:
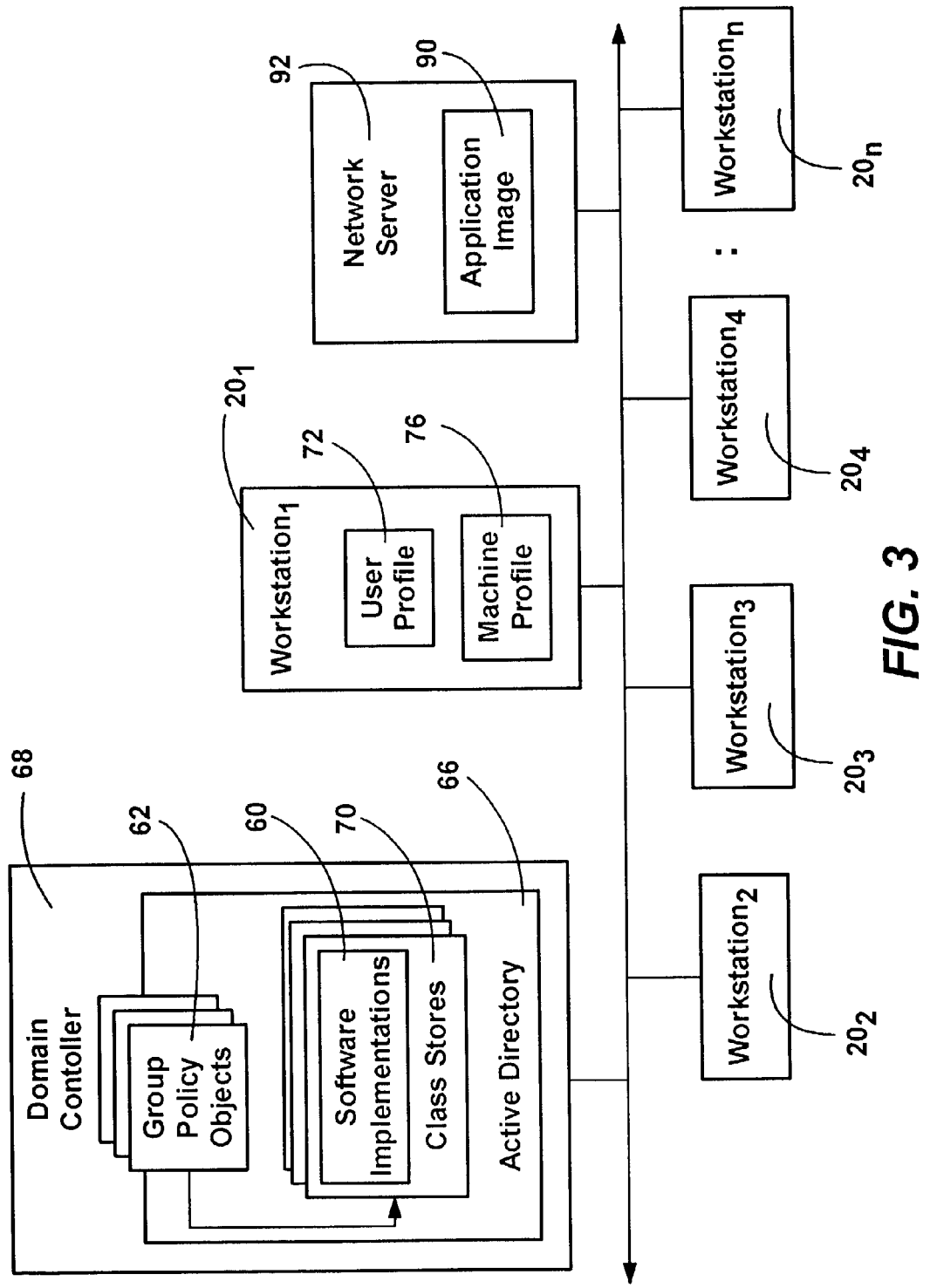
FIG. 3 is a block diagram generally representing a computer network into which the present invention may be incorporated.

Although not necessary to the present invention, group policies 62 are maintained via a Windows® 2000 directory service, known as the Active Directory 66, ordinarily maintained in a domain controller 68 (FIG. 3). More particularly, each group policy object 62 comprises a group policy container in the directory service and a group policy template in the "sysvol" of the domain controller 68, but for purposes of simplicity are generically referred to herein as a group policy object. In general, the Active Directory 66 stores information about the objects of a domain, and makes this information easy for administrators to access, find and apply via a single, consistent and open set of interfaces. For example, with the Active Directory 66, administrators have a single point of administration for the objects on the network, which can be viewed in a hierarchical structure. A core unit in the Active Directory 66 is the domain, and the objects of a network exist within a domain. A single domain can span multiple physical locations or sites.

Thus, one aspect of the present invention is described herein with reference to the Microsoft® Windows® 2000 (formerly Windows NT®) operating system, and in particular to the flexible hierarchical structure of sites, domains and/or organizational units of a Windows® 2000 Active Directory 66. Notwithstanding, there is no intention to limit the present invention to Windows® 2000 and/or the Active Directory architecture, or even to networks, but on the contrary, the present invention is intended to operate with and provide benefits with any operating system, architecture and/or mechanisms that install software implementations.

Software Implementation Installer Method and Mechanism

In general, a first aspect related to the present invention involves the on-demand installation of applications, such as for purposes of application deployment, i.e., initially making an application or some piece, thereof available (e.g., core code) to network policy recipients via policies 62. As described in the copending United States patent applications entitled "Method and System for Assigning and Publishing Applications" and "Method and System for Advertising Applications," assigned to the assignee of the present invention, filed concurrently herewith and hereby incorporated by reference herein in their entireties, to initially deploy an application, an administrator can choose to either "assign" or "publish" the application. To this end, as shown in FIGS. 2 and 3, one or more group policy objects (templates) 66 associated with users or machines of a directory container may be associated with policy recipients, and a subcontainer of each group policy object, deemed a class store, may include application deployment information. Note that although separately shown in FIG. 2 for purposes of simplicity, a class store 70 is actually a subcontainer of the group policy container, as described in more detail in copending United States Patent Application entitled "Class Store Schema," assigned to the same assignee as the present invention, filed concurrently herewith and hereby incorporated by reference herein in its entirety.

Via this centrally maintained deployment information in the class store 70, policy recipients (e.g., users and workstations/machines) in a directory container 64 (e.g., organizational unit) are assigned applications, or applications are published thereto. An application typically is assigned to a group of users (or a group of machines) when it is deemed mandatory for that group to have that application, while published applications are those that are made optionally available to users who may benefit therefrom. For example, the same version of an electronic mail application program may be assigned to everyone in an organization, while a word processing program may be assigned to every group of users that needs some word processing capabilities. However, an application program for editing images may not be needed by everyone, and thus such a program may be published on a per-group basis so that those groups of users who may benefit from the program have it, while others who do not need it will not have it occupy resources of their workstations. Publishing is generally described below.

Assigned applications are advertised, i.e., they appear as available to a user at each logon (if assigned to a user) or at each re-boot (if assigned to a machine). Advertised applications are not necessarily installed on the workstation, but rather may only appear to be installed. To make an application appear installed, advertisements for an application include shortcuts that appear on the Start Menu, a collection of registry entries required primarily for OLE and shell activation, and icon files, (note that these concepts of advertising are valid for both network and standalone users).

For example, to explicitly launch an application, users navigate the Start Menu looking for a shortcut representing the application, then click that shortcut. Thus, shortcuts placed on the Start Menu represent a blatant advertisement for an application. Users also implicitly launch applications by double-clicking a file (of a file system) having an extension associated with a particular application. Since associations between file extensions and applications are stored in the system registry 74 (FIG. 4), writing such associations to the registry 74 is another way in which the present invention may advertise applications. Other examples of how an application is advertised include writing class information (i.e., for OLE/COM activation), MIME associations and shell verbs.

Assigned applications are also resilient, in that they will be re-advertised on the next logon (or machine re-boot as appropriate) if deleted from the local workstation (machine) $20_1$. For purposes of simplicity, assignment will hereinafter ordinarily be described with reference to being applied to users via a policy at user logon, although it is understood that policies may be applied to a machine when the machine connects to the network, e.g., at machine re-boot, and thus applications may be assigned to machines (e.g., via a machine profile 79) in the same general manner as users. Moreover, even if a user installs another program or different version of the application over an assigned application, because the advertise script is applied, the assigned application (the administrator-specified version) will return at the next logon. Only an administrator (and in particular a domain administrator) may permanently remove an assigned application, by doing so via the centralized location.

Another way in which applications are resilient, for example, is when the target of the shortcut has already been installed, but certain key files have been deleted. As described below and in the aforementioned patent application entitled "System and Method for Repairing a Damaged Application," hereby incorporated by reference herein in its entirety, the application may cause the on-demand installation of the files, thereby repairing itself. Such resiliency applies to both network and standalone users, e.g., the application may repair itself from a network source or via a source such as a CD-ROM.

Figure 4:
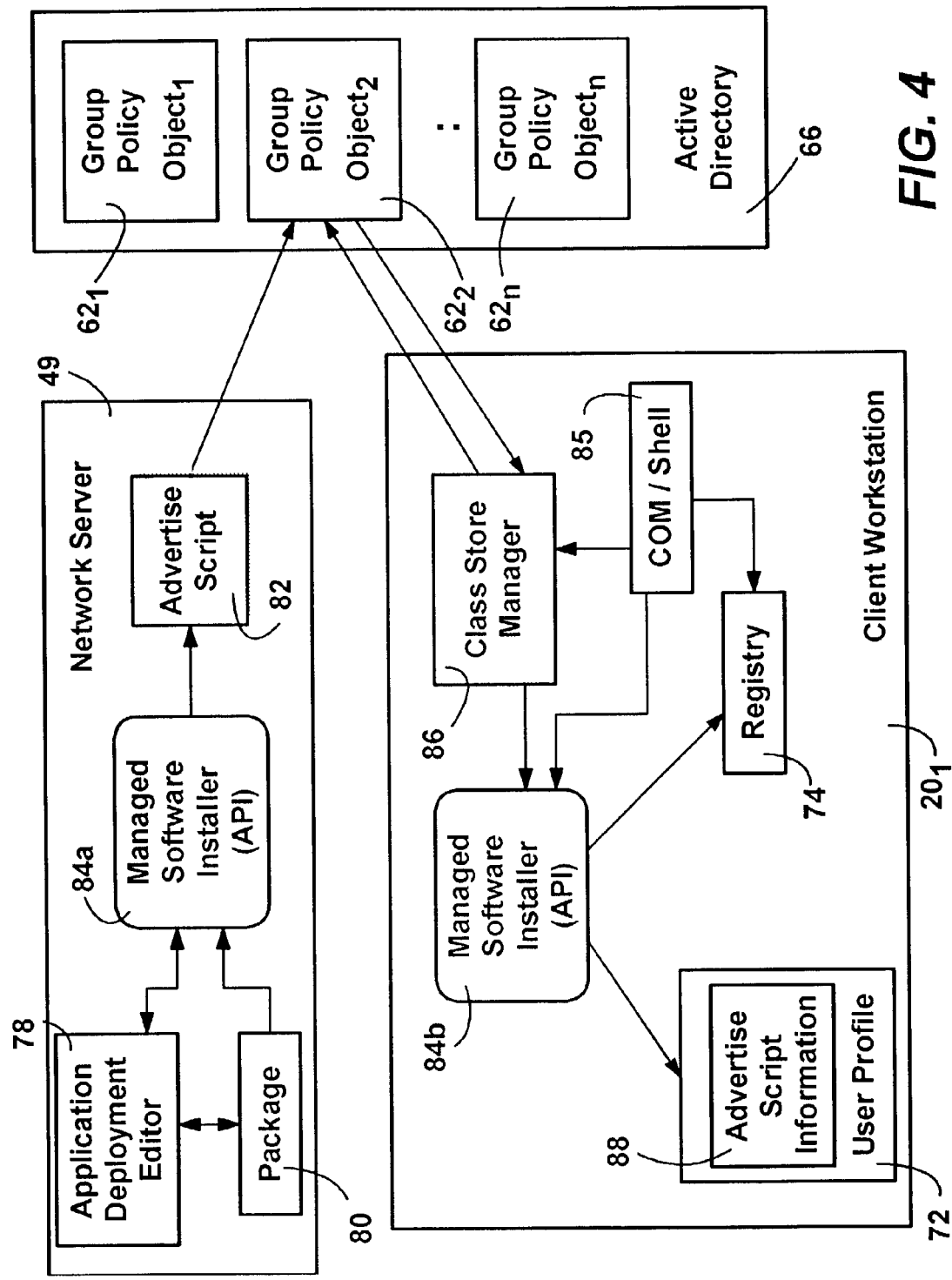
FIG. 4 is a block diagram generally representing exemplary components for possible on-demand installation thereof.

To assign an application, as generally shown in FIG. 4, the administrator, using an application deployment editor 78 or other suitable tool, selects an application package (e.g., 80). The application deployment editor 78 causes an advertise script 82 (a file) to be generated and stored for one or more groups of users (or machines) in a group policy template (object), e.g., $62_2$, of the Active Directory 66. More particularly, to generate the advertise script 82, the application deployment editor 72 calls the MsiADvertiseProduct( ) API (application programming interface) of a managed software installer mechanism 84a (named the "Windows installer" in one preferred implementation) with the information as set forth in the table below:

```
UINT MsiAdvertiseProduct(
LPCTSTR  szPackagePath     // Fully qualified path to a package
LPCTSTR  szScriptFilePath  // If NULL, product is advertised locally
LPCTSTR  szTransforms      // Semi-colon delimited list of transforms
LANGID   idLanguage        // Language of product being advertised
);
```

Upon successful completion, the result is the advertise script 82 containing records for creating advertisement information, e.g., including shortcuts, icon files, and OLE and shell activation registry entries. Note that in the network environment, szScriptFilePath may specify a file stored in the applications folder of the group policy object 66₂ as represented in FIG. 4. In general, the advertise script 82 comprises information corresponding to a series of commands, API calls, or the like, such as resulting in standard API calls to write various information to the registry 74 at certain keys, add application shortcuts to the Start Menu, and so on. For purposes of simplicity, the usage of well-documented APIs to write information to a registry and add shortcuts to menu folders will not be described herein in detail.

As shown in FIG. 2, packages such as the packages 80 are stored and cataloged under the class stores 70, and may be available from various vendors for different platforms, activation modes, access control, setup, and installation information. For example, the package 80 may include an entire application (e.g., Microsoft® Word or Excel), a set of binary component implementations packaged together, or a standalone COM (Component Object Model) component (e.g., an ActiveX™ control).

Once the advertise script 82 is generated and stored in the group policy template 62₂, a user having the group policy template 62₂ applied thereto (e.g., at logon) receives the advertise script 82 in their user profile 78. Logon code 86 then calls a local managed software installer mechanism 84b to process the advertise script 82, the result of which is the creation of a collection of advertisement information 88 including shortcuts on the Start Menu and registry entries required for shell and OLE activation. Advertisement information references the managed software installer mechanism 84b, and, as described below, the operating system 35 knows what to do when it encounters such information. Lastly, in accordance with one aspect of the present invention and as described in detail below, the managed software installer mechanism 84b is involved is when activation occurs, i.e., the managed software installer mechanism 84b is called when an application is activated to install one or more components as needed to service the activation request.

Figure 6:
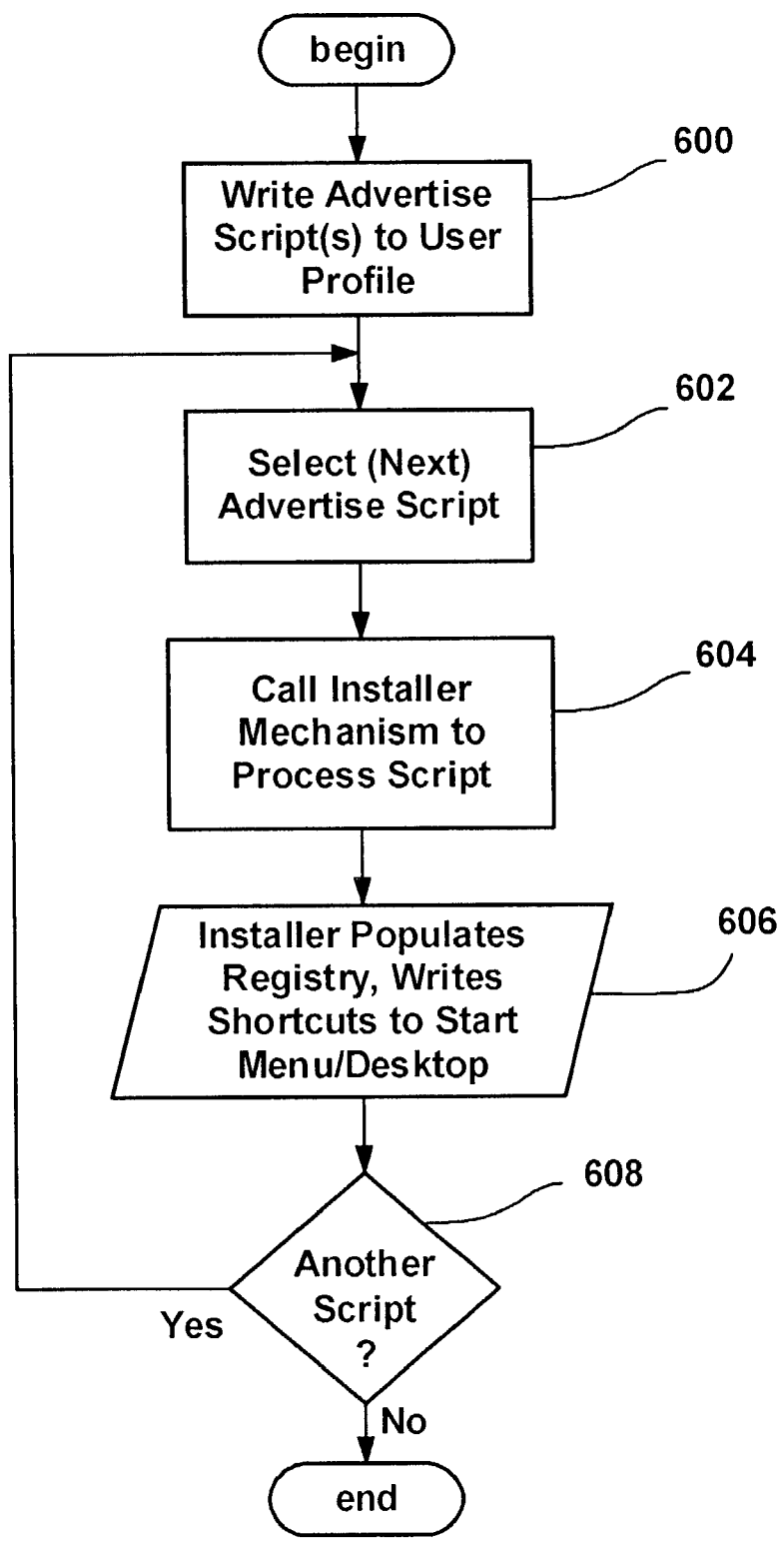
FIG. 6 is a flow diagram generally representing the steps taken at user logon to advertise an assigned application.

In general, executing the advertising script 82 makes the application appear to be available to the user, including writing information to the system registry 74 and adding script information such as shortcuts to assigned programs to the user profile 78 (e.g., the Start Menu or desktop) on the workstation. FIG. 6 shows the steps taken by the logon process 86 at user logon, beginning at step 600 wherein as part of applying the group policy template 62₂ (and any other templates), the logon process 86 writes the advertising script 82 (and any other scripts) to the user profile 72 in the local workstation 20₁. At step 602, an advertise script is selected from the user profile. To resolve potential conflicts in accordance with policy settings, the selection may be in a prioritized order, (as described in the aforementioned "Group Policy" patent application). In any event, once selected, the installer mechanism 84b is called at step 604 to process the script, e.g., populate the registry with information such as file-extension associations, write application shortcuts to the user's Start Menu or desktop and so on as represented by step 606. Step 608 repeats the processing of scripts (one of which will be the script 82) until there are no more to process.

More particularly, each of these advertise scripts associated with the directory containers 64 to which the user belongs are handed to the managed software installer mechanism 84b for processing, via the MsiAdvertiseScript( ) API, as set forth in the table below:

```
UINT WINAPI MsiAdvertiseScript (
LPCTSTR  szScriptFile, // path to script from MsiAdvertiseProduct
DWORD    dwFlags, // the SCRIPTFLAGS bit flags that control the
                  script execution
PHKEY    phRegData, // optional parent registry key
BOOL     fRemoveItems); // TRUE if specified items are to be removed
```

Possible bits for the "dwFlags" argument include:

```
Typedef enum tagSCRIPTFLAGS
{
SCRIPTFLAGS_CACHEINFO = 0x00000001L,            // set if the icons need to be
                                                // created/ removed
SCRIPTFLAGS_SHORTCUTS = 0x00000004L,            // set if the shortcuts needs to
                                                // be created/ deleted
SCRIPTFLAGS_MACHINEASSIGN = 0x00000008L,        // set if product to be
                                                // assigned to machine
SCRIPTFLAGS_REGDATA_APPINFO = 0x00000010L,      // set if the app advt
                                                // registry data needs to be written/ removed
SCRIPTFLAGS_REGDATA_CNFGINFO = 0x00000020L,     // set if the product cnfg
                                                // mgmt registry data needs to be
                                                // written/ removed SCRIPTFLAGS_REGDATA = SCRIPTFLAGS_REGDATA_APPINFO |
SCRIPTFLAGS_REGDATA_CNFGINFO,                   // for source level backward compatibility
SCRIPTFLAGS_VALIDATE_TRANSFORMS LIST = 0x00000040L
} SCRIPTFLAGS;
```

The MsiAdvertiseScript( ) serially executes the list of advertise script information 82 in accordance with the above parameters. Once successfully processed, an advertise script stores information in the user's profile and the system registry that is used to manage advertised applications. This set of per-user information includes attributes for each advertised product, source list information, feature-to-product associations, and descriptors for each advertised component. Note that the script need not necessarily store its data in the registry, but may alternatively store it elsewhere on the local workstation, and the operating system made aware of the location.

In accordance with one aspect of the present invention, assigned and published applications may be installed (and also patched, as described below) on the local workstation 20₁ on an as-needed basis (on demand) by the managed software installer mechanism 84b. For example, the first time that a user activates such an application (e.g., via the Start Menu), the managed software installer mechanism 84b looks for it on the local machine but does not find it, after which the managed software installer mechanism 84b installs the application, such as via a software implementation 60 maintained in the class store 70 and/or via an application image 90 (FIG. 3) on a network server 92. Note that the network server 92 may be the same server 49 on which the application package 80 was loaded, which may or may not be the domain controller 68, however as can be appreciated, this is not necessary. Thereafter, the application remains on the local workstation 20₁ and need not be re-installed, unless deleted in some manner. However, even if deleted, the application will be re-advertised the next time policy is applied, e.g., at the next user logon, whereby if again activated, the application will again be re-installed. Note that if the application is installed but damaged, e.g., key files are deleted, the application may perform self-repair at this time. In this manner, assigned applications are automatically deployed in accordance with a policy, but for purposes of efficiency, initially may be only advertised rather than installed. Similarly, a standalone user may have programs advertised without taking up substantial storage on the user's machine. Thus, as can be readily appreciated, installing programs only if and when activated provides substantial benefits, including efficient use of workstation resources, rapid user-logon, and balancing of the load on the network servers.

To manage the advertised applications, the managed software installer mechanism 84b uses the identifiers set forth in the following table:

| | |
|---|---|
| {ProductCode} | A standard GUID which uniquely identifies a product. |
| FeatureID | A string which represents a feature. A FeatureID should be human readable and need only be unique within a given product. |
| {ComponentCode} | A standard GUID which uniquely identifies a component. |
| [Descriptor] | A descriptor is comprised of a {ProductCode}, a FeatureID and a {ComponentCode} within square brackets, e.g., [{ProductCode}FeatureIDdelimiter {ComponentCode}]. A delimiter exists between the FeatureID and the {ComponentCode} since a FeatureID is variable in length. |
| Delimiter | ASCII value 2, chosen so as to not collide with characters that might appear as part of a FeatureID |

In certain cases "compressed" descriptors, which have a slightly different format, may be used. Products, features components and descriptors are described in more detail below with particular respect to FIG. 13. The per-user configuration manager information is stored below the registry key HKEY_CURRENT_USER\Software\Microsoft\Installer. General properties for each advertised product are stored under a Products key by {ProductCode}.

Figure 7:
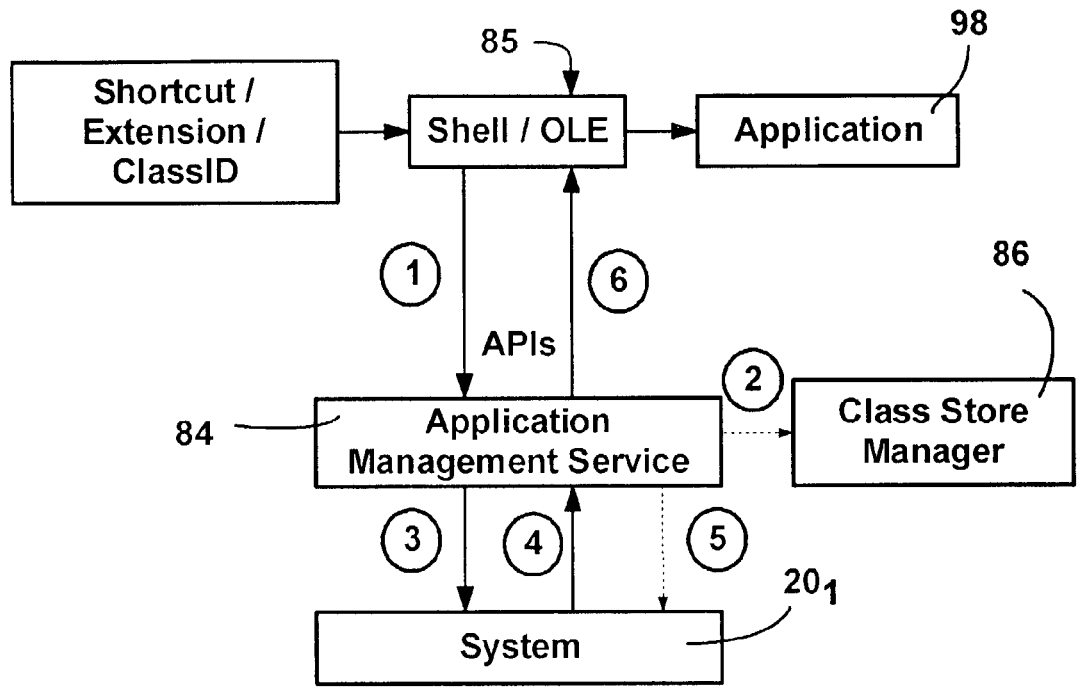
FIG. 7 is a block diagram generally representing the installer mechanism handling on-demand installation in response to a request by the operating system or OLE.

An association between the managed software installer mechanism 84b and the operating system 35 (e.g., shell and essentially OLE) enables on-demand installation of software implementations. For example, as represented in FIG. 7, shell and OLE activation code (collectively 85), as well as many shell and OLE-related registry entries, are preferably installer mechanism-aware.

To this end, managed shortcuts include a descriptor (based on a shortcut, classID, file extension and so on) that the shell activation code (of the operating system 35) detects, and hands to the managed software installer mechanism 84b, (to await resolution in the form of a path, which it may then process). Similarly, OLE activation is aware of such descriptors, and calls an API of the managed software installer mechanism 84b to resolve them. Both of these operations are represented in FIG. 7 by the circled numeral one.

Figure 8:
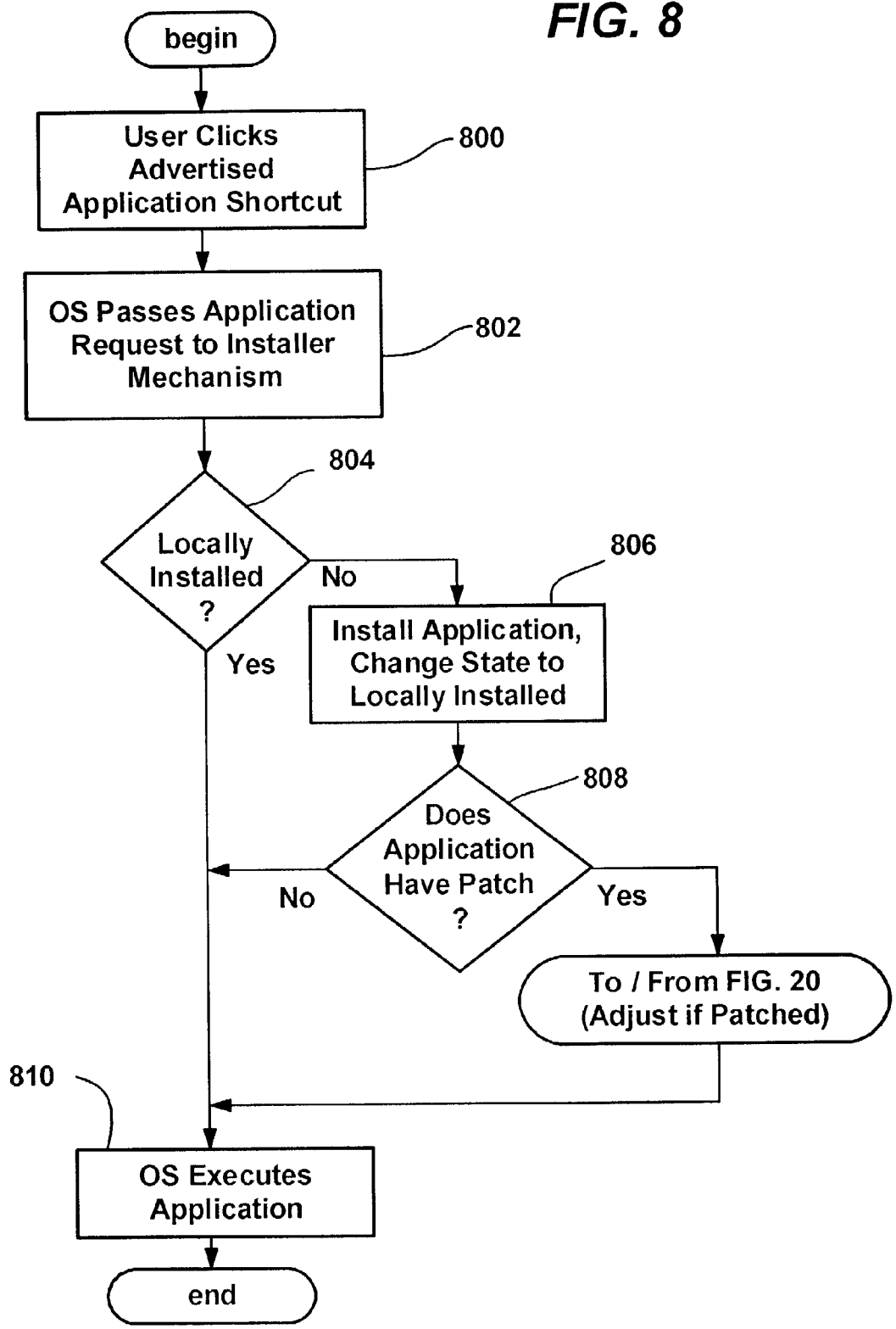
FIG. 8 is a flow diagram generally representing the steps taken when a user activates an assigned application via a shortcut including possible on-demand installation thereof.
Figure 20:
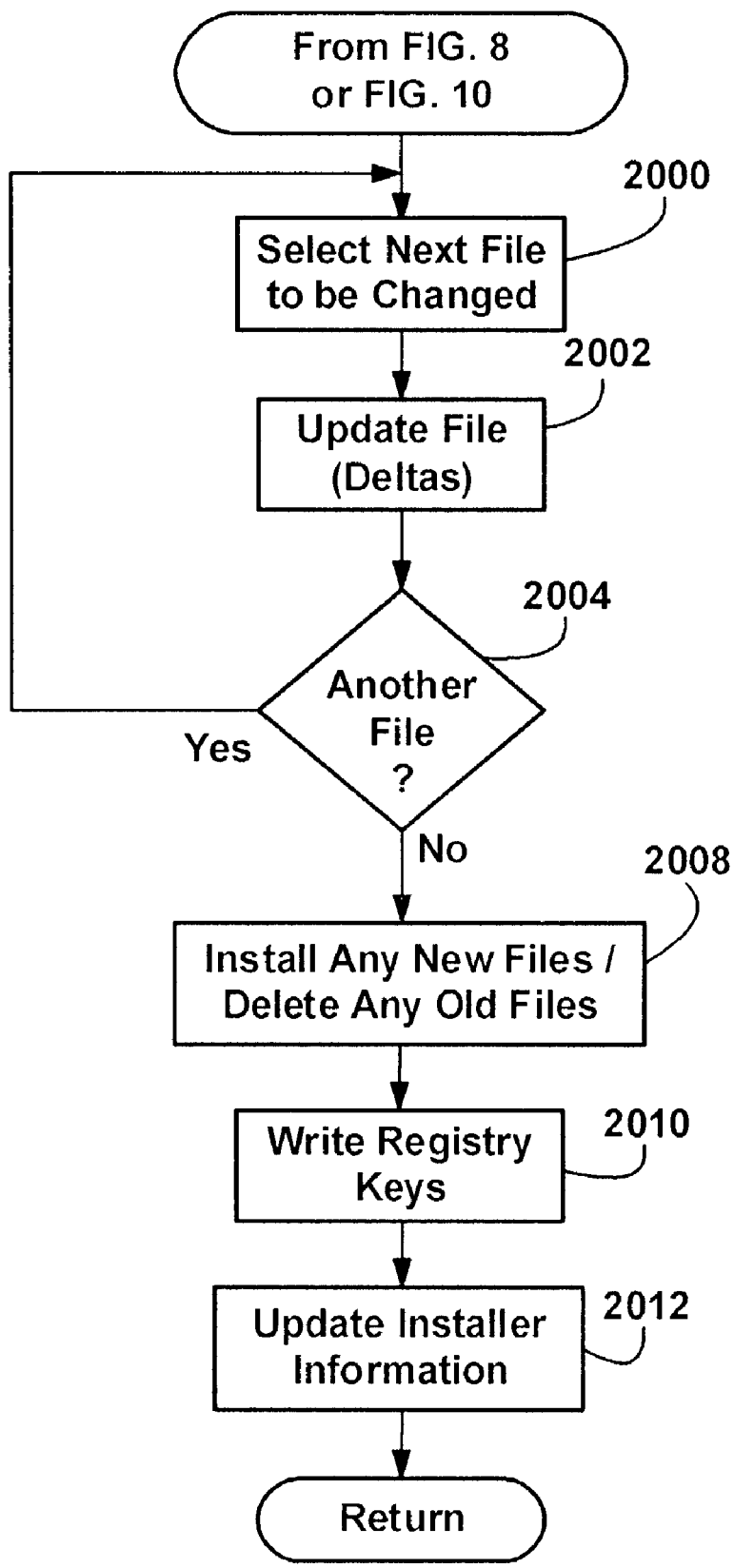
FIG. 20 is a flow diagram generally representing the steps taken to perform on-demand patching of an application in accordance with an aspect of the present invention.

By way of a first example, FIG. 8 shows the general operation taken by the installer 84b when a user attempts to activate an advertised application (e.g., 98) by clicking a shortcut corresponding thereto, beginning at step 800. At step 802, the operating system 35 communicates with the managed software installer mechanism 84b to determine if the application 98 is locally installed, one of the possible states of an advertised application as described below. As represented by the circled numeral two in FIG. 7, the managed software installer mechanism 84b looks to the system (i.e., the registry or similar database) to determine if the state is locally installed (or broken, for purposes of self-repair), and receives this state information as represented by the circled numeral three. At step 804 (FIG. 8), if the application 98 is not locally installed, the installer 84b installs it (or at least some core portion thereof) at step 806, as also represented by the circled numeral four in FIG. 7, wherein the dashed line beside the circled numeral four indicates an optional operation, and as described in more detail below. Also, the state of the application 98 is changed to locally installed, so that the next time activation thereof is requested, installation is not necessary. Moreover, the application may be patched if a patch has been applied thereto, as evaluated at step 808. FIG. 20, described below, represents the steps taken to patch an application on demand when a patch has been applied thereto, in accordance with the present invention. Lastly, the managed software installer mechanism 84b provides the operating system/OLE 35 with the information needed to execute the application (circled numeral five in FIG. 7), and at step 810 (FIG. 8) the operating system 35 executes the application. Note that except for possible installation delay times, in typical situations, the installation is essentially invisible to the requesting user. Of course, if the source cannot be located, e.g., the network is down or a CD-ROM source is not in the drive, the install may fail, look for another source, and/or the user may see a prompt requesting some user action. More particularly, see the aforementioned U.S. patent application entitled "System and Method for Managing Locations of Software Components Via a Source List."

An administrator may also choose to publish an application, essentially to make the application available to a user if needed. Published applications are just as manageable as assigned applications, however unlike assigned applications, a published application has no presence on a user's machine until invoked. Thus, a published application has no attributes on the client machine, but rather has its attributes stored in the Active Directory 66. A published application can be located in the Active Directory in a number of ways, including via an application name, a class ID serviced by the application, a program ID serviced by the application, a file extension serviced by the application, and MIME type or content type serviced by the application.

To this end, each of the above attributes may be used as the key to locate a published application in the Active Directory 66. Then, once a published application is located, the application's user-friendly (human readable) name is available, as well as enough information to assign the application to the user. Thus, until needed, a published application is not installed, nor does it appear to the user to be installed. For example, there are no shortcuts present to use for activating the application. Instead, published applications may be activated by the above-attributes such as file extension, in a two-step process as described below with particular reference to FIGS. 9–10. First the operating system 35 shell (or similarly OLE) attempts to locate the application activation information in the local machine's registry 74. If the information is not found (as with a published application), an Active Directory 66 lookup occurs (as described in the aforementioned "Class Store Schema" patent application. This is alternatively shown by circled numerals one and two in FIG. 7. Note that the administrator may prioritize which application in the class stores handles which extension. If found, the application script is advertised as described above, i.e., the application is effectively assigned to the user, the registry is populated, the item added to the Start Menu, and so on as if the application was assigned. The process then launches the application. Conversely, if no associated application is found in the class stores 70, an appropriate error is returned (e.g., no association for this application for this user). Note that the user may be given a roaming profile, whereby such information roams with the user regardless of where the user logon takes place. If not, the information stays on the machine that triggered the assignment. In this manner, published applications as well as assigned applications essentially follow the user around. Once the application is assigned, activation continues as with normal assigned applications.

Figure 9:
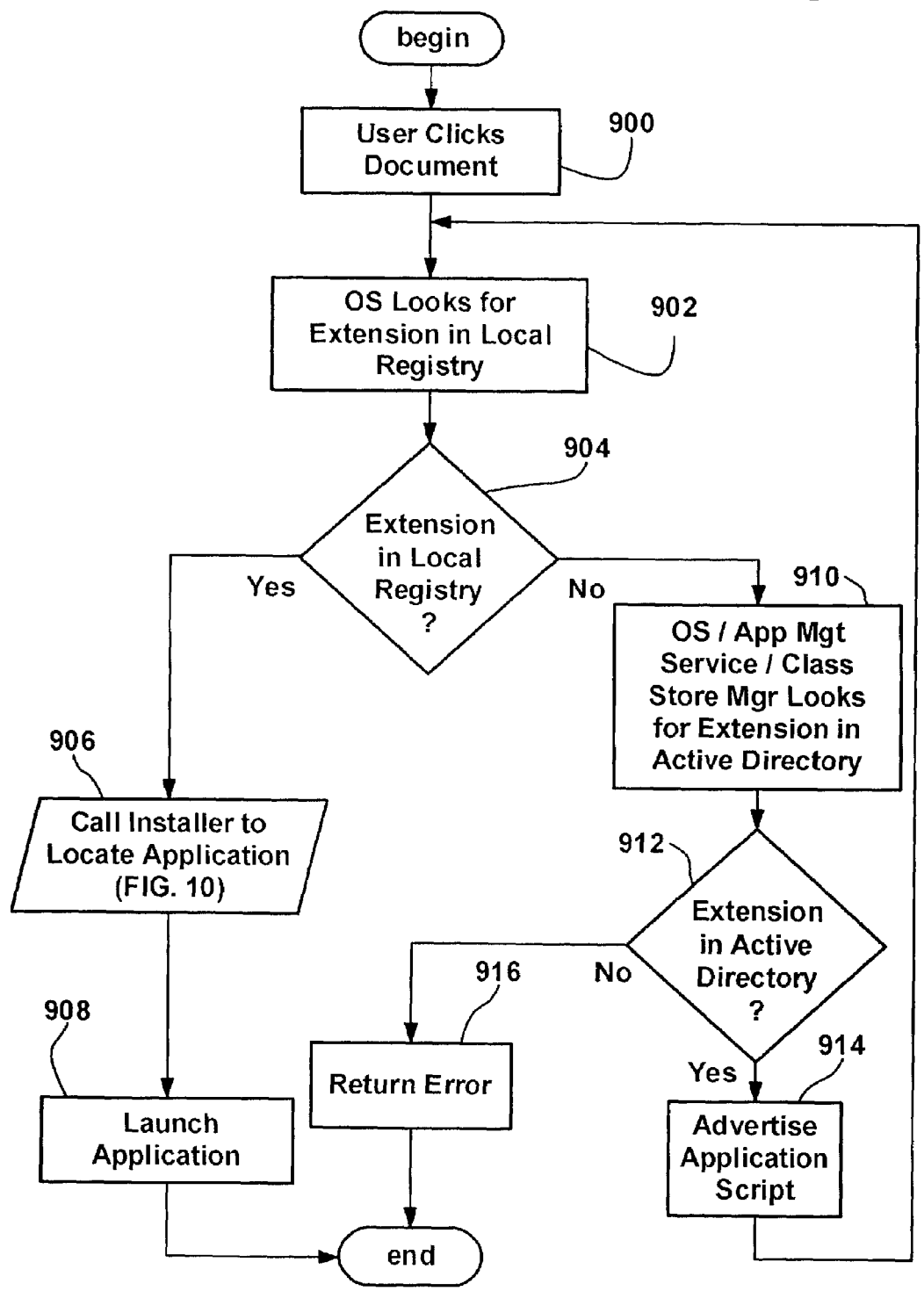
FIG. 9 is a flow diagram generally representing the steps taken when a user attempts to activate an application via a file extension associated therewith.
Figure 10:
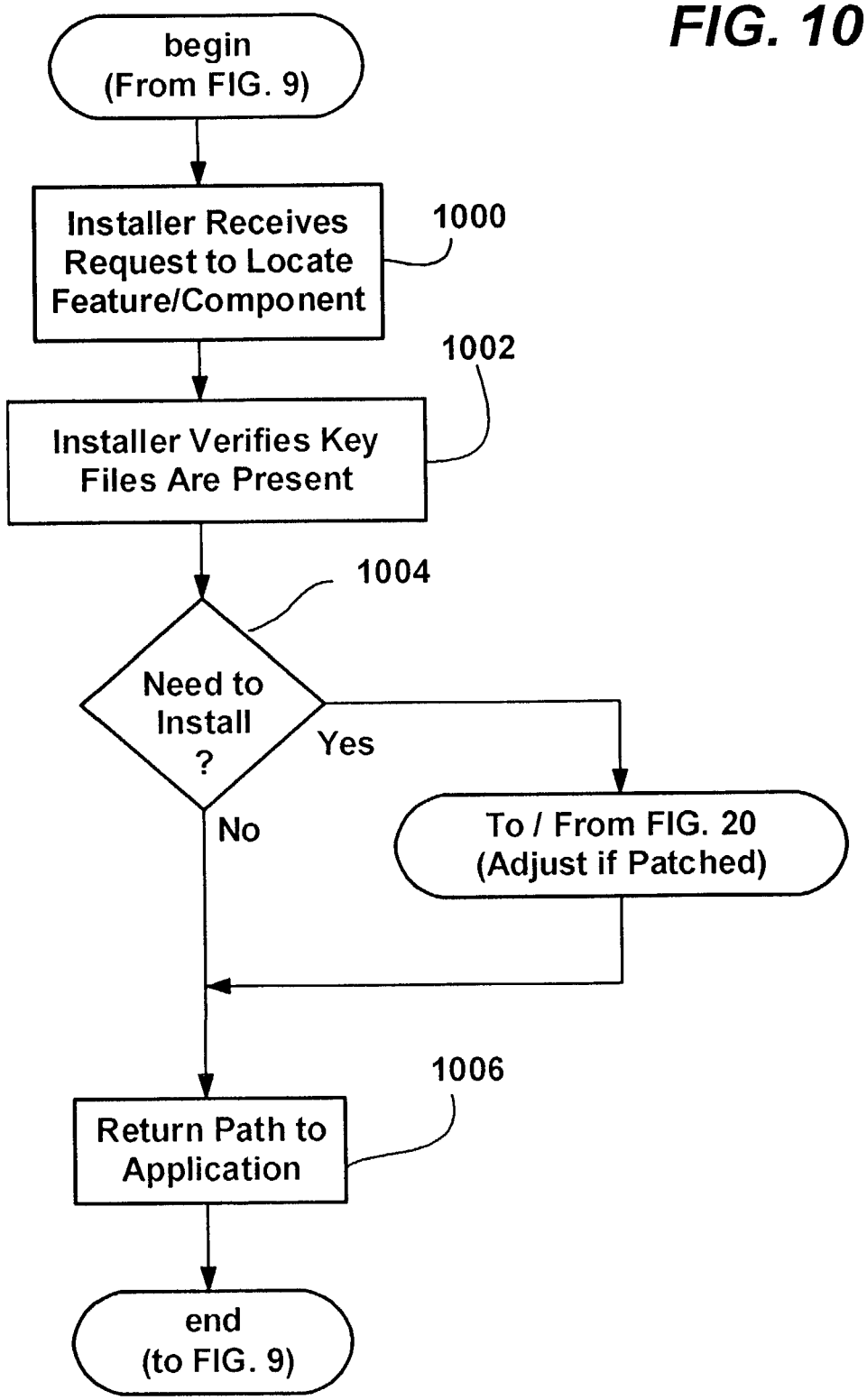
FIG. 10 is a flow diagram generally representing the steps taken by an installer mechanism to possibly install an application associated with a file extension.

By way of another example of the on-demand installation of applications, both assigned and published applications may be activated by invoking (e.g., double-clicking) a file (document) having an extension with an associated application registered in the registry. FIGS. 9 and 10 show how such an action may lead to the file being installed if needed, beginning at step 900 which represents the double-clicking (or similar operation such as right-click, open) of the document. At step 902, the operating system shell 85 looks to the local registry 74 for file extension information, i.e., an application associated with the file extension. If the information is found, step 904 branches to step 906 which then calls the installer 84b to locate the associated application and return a file system path thereto (FIG. 10) as described below. Note that the administrator may prioritize which application handles which extension since multiple applications may be capable of handling the same file type.

If not found in the local registry 74 at step 904, then an application corresponding to the extension has not been assigned, however an application corresponding to the extension may still be published to the requesting user. Published applications are just as manageable as assigned applications, however unlike assigned applications, a published application has no presence on a user's machine until invoked. Thus, a published application has no attributes on the client machine, but rather has its attributes stored in the Active Directory 66. Notwithstanding, a published application may be patched by maintaining information accessible to the installer 84b indicating that a certain patch is to be applied if a published application is ever installed. In this case, the patch is considered to be applied to the application already, because enough of the application exists on the machine (e.g., some installer registry information) that allows the patch to be registered. Note that even though the patch is considered to be already applied to the product, no files, registry keys and so on for that product may be modified because they have not yet been installed.

Note that a published application can be located in the Active Directory in a number of ways, including via an application name, a class ID serviced by the application, a program ID serviced by the application, a file extension serviced by the application, an interface identifier serviced by the application and MIME type or content type serviced by the application. To this end, each of the above attributes may be used as the key to locate a published application in the Active Directory 66. Then, once a published application is located, the application's user-friendly (human readable) name is available, as well as enough information to assign the application to the user. Thus, until needed, a published application is not installed, nor does it appear to the user to be installed. For example, there are no shortcuts present to use for activating the application.

Thus, when a possibly-published application is invoked, step 904 branches to step 910 to look for the extension information in the Active Directory 66, i.e., the class stores 70 associated with this user. To determine this, at step 910, the operating system calls an application management service 84 to find the appropriate script or scripts and look in the scripts for the file association. To this end, a class store manager 86 is called by the application management service 84 to query the class stores 70 for an appropriate application as described in the aforementioned "Class Store Schema" patent application. This is alternatively shown by circled numerals one and two in FIG. 7. Note that the administrator may similarly prioritize which application in the class stores handles which extension. If found, the application script is advertised at step 914 as described above, i.e., the application is effectively assigned to the user, the registry is populated, the item added to the Start Menu, and so on as if the application was assigned. The process then returns to step 902 so that the application may be launched. Conversely, if no associated application is found in the class stores 70 at step 912, an appropriate error is returned (e.g., no association for this application for this user) at step 916.

Note that if the directory lookup is successful, the return information is used to assign the application to the user's profile. As a result, the user may be given a roaming profile, whereby such information roams with the user regardless of where the user logon takes place. If not, the information stays on the machine that triggered the assignment. In this manner, published applications as well as assigned applications essentially follow the user around. Once the application is assigned, activation continues as with normal assigned applications.

To launch an application, managed shortcuts include a descriptor (based on a shortcut, classID, file extension and so on) that the shell activation code (of the operating system 35) detects, and hands to the managed software installer mechanism 84b, (to await resolution in the form of a path, which it may then process). Similarly, OLE activation is aware of such descriptors, and calls an API of the managed software installer mechanism 84b to resolve them.

Figure 5:
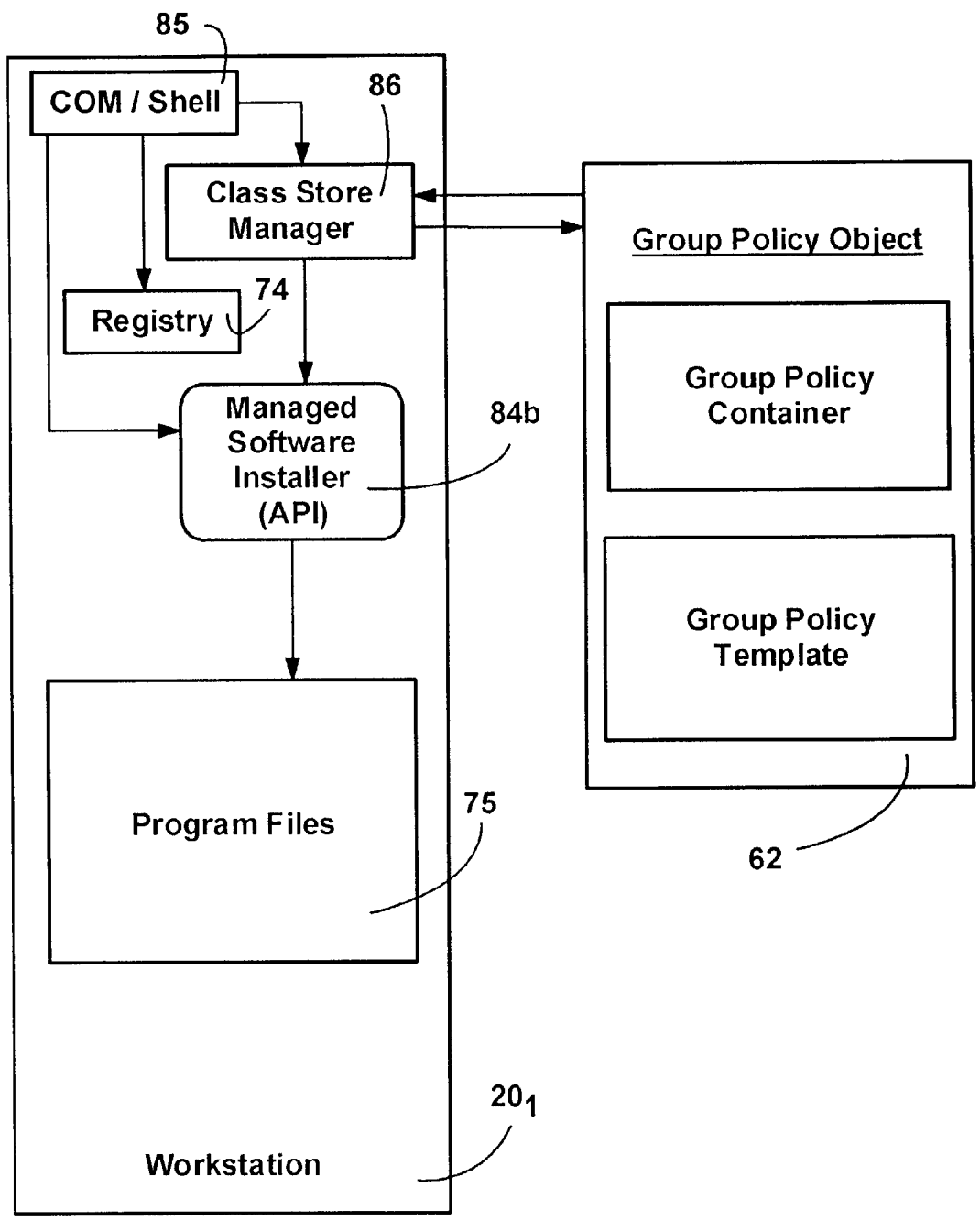
FIG. 5 is a block diagram generally representing the processing of on-demand location and installation of applications for policy recipients.

FIG. 10 shows the steps taken by the installer 84b to locate the application, and install it as needed. When the installer 84b receives the extension information, (step 1000), the managed software installer mechanism 84b verifies if the key file or files are present (step 1002). As represented by the circled numeral three in FIG. 7, the managed software installer mechanism 84b looks to the system (i.e., the registry or similar database) to determine if the state is locally installed, and receives this state information as represented by the circled numeral four. If the application is not locally installed (step 1004), the installer 84b installs it, (e.g., into a program files folder 75, FIG. 5, of the file system), as shown by circled numeral five and as described below.

As part of the process that returns the file system path, the installer 84b thus verifies that the application in question has been installed and/or has its key files intact, as represented by step 1002. If the application is not installed, or is determined to be damaged, the installer will install and/or repair the application by installing any needed files, as represented by steps 1004 and the steps of FIG. 20. FIG. 20, described below, represents the steps taken when a patch has been applied, wherein the installer 84b handles the patching of the application.

Lastly, at step 1006, the installer returns the application path to the operating system. Regardless of whether previously installed or not, and assuming no other errors, security problems and so forth, the application is launched at step 908 (FIG. 9 and circled numeral six, FIG. 7), and the application appropriately opens the document.

Note that many file extensions are capable of being handled by multiple applications. The administrator or user may prioritize which applications open which files. To this end, each application sets forth the file extensions it is capable of handling, and this information is stored in the Active Directory 66. When a file extension is selected, a suitable mechanism may be employed to scan the application information in the Active Directory to locate those applications that handle that file type. Via a suitable user interface, the administrator may then determine which application association gets written into the registry for that file type, and also may rank the order of searching for a suitable application in the class store 70 to open the file in the event that the association is not found in the registry. The ability to recognize applications which service the same extension, and therefore the ability to prioritize them, stems largely from two features of the installer, i.e., the ability to create advertise scripts, and the fact that the extensions serviced by a given product can easily be read from .MSI packages.

In addition to installing applications, the managed software installer mechanism 84b may install other software implementations such as an application's object classes 94 (FIG. 2). To this end, the class store 70 maintains the classes 94 (or the information needed to locate the classes on the network). When the operating system 35, OLE or the like receives a request for an object class, it first communicates with the managed software installer mechanism 84b to determine if the object class is locally installed. If not found locally, the managed software installer mechanism 84b looks for the object class in the class store 70. If found, the managed software installer mechanism 84b installs the object class therefrom, instead of returning an error.

The managed software installer mechanism 84b may also install software implementations based on information such as component categories 96. For example, a category to which an application belongs effectively may be "spreadsheet." If the managed software installer mechanism 84b receives a category request for a spreadsheet application, the mechanism 84b may look to the component categories 96, also maintained in the class store 70, to determine if a spreadsheet application is published to the user, and if so, install that application.

In general, the managed software installer mechanism 84 b provides a standard installation mechanism for applications and components, i.e., it is an execution engine for the setup scripts generated by the application deployment editor 78 or other various authoring tools. In general, the package is what a developer uses an authoring tool to create, i.e., essentially when a developer "writes a setup," the result is a Windows installer package. From that package, advertise scripts are created, and subsequently executed. However, it is also possible to install the package itself by generating and then running an install script. Generation and execution of install scripts are both handled on the end user's machine, in contrast to the advertising script model. For example, this happens in response to a standalone install, or as the result of install on demand.

Figure 11:
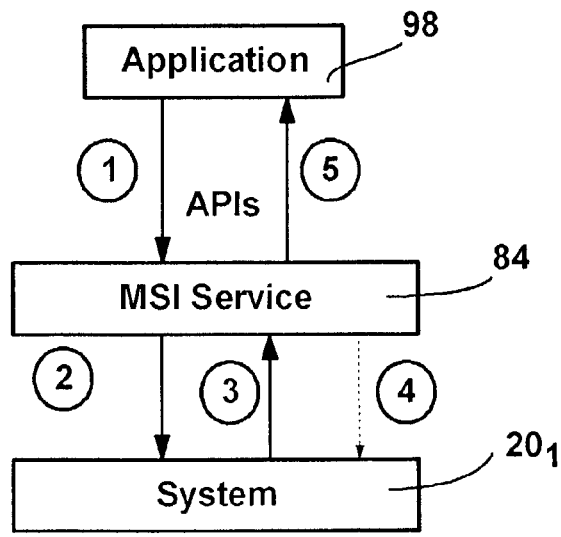
FIG. 11 is a block diagram generally representing the installer mechanism handling on-demand installation in response to a request by an application.

As described in more detail below, the managed software installer mechanism 84b also exposes an application programming interface (API) which an application program 98 may use (FIG. 11) to determine what installation choices users made, or even to install missing components. For example, if a component is missing, the application 98 itself may in effect run setup for the user, using installer APIs as set forth below to install the missing component. Moreover, because the managed software installer mechanism 84b is a basic system service that tracks information about what is installed, it may provide administrators in managed environments with a powerful set of tools for determining the software installed, and remotely pushing software installation down to user machines.

Figure 12:
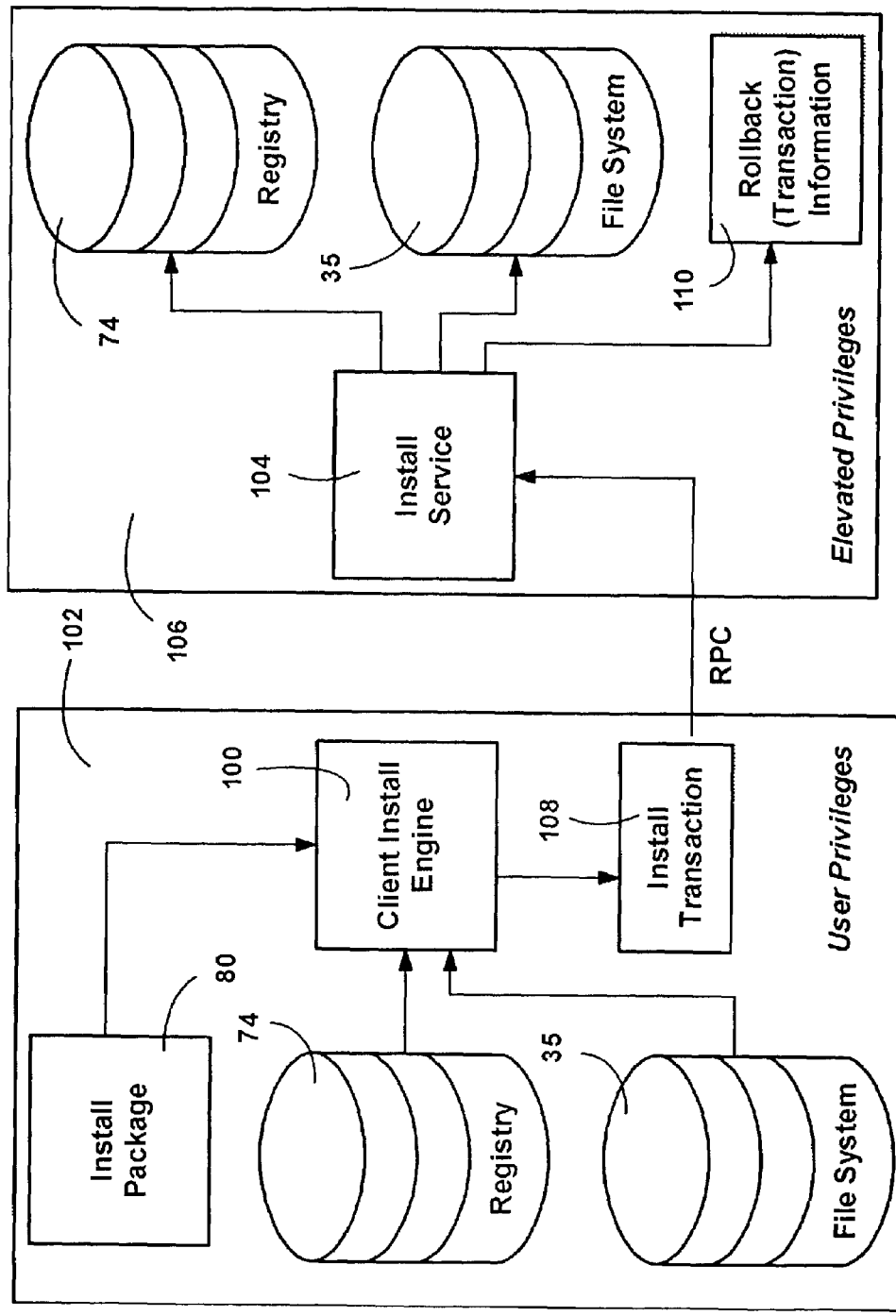
FIG. 12 is a block diagram generally illustrating the components for installing software implementations in accordance with various aspects of the present invention.

FIG. 12 illustrates the managed software installer mechanism 84b architecture as embodied in the Windows® 2000 operating system, wherein the installer consists of two executable components, a client install engine 100, which runs with user privileges 102, and an install service 104. Because the install service 96 is implemented as an Windows® 2000 Service, it may be run with elevated administrative privileges 106. Note that changes to the system configuration (e.g., changes to the registry 74 and file system 35) are done as an installation transaction 108 by the install service 104, and the rollback transactions 110 are logged to provide for rollback of a failed or aborted installation. The rollback includes restoring the original contents of files replaced or deleted during the installation and restoring overwritten or deleted registry settings (e.g., COM class registration). Note that since this rollback information 110 may take up a significant amount of space, it may be disabled by an administrator or a user when performing an installation. The client install engine 100 and the install service 104 communicate through secure remote procedure calls. Note that where everything is in the same process, (e.g., in Windows 95 or Windows 98), secure RPC is not used.

Figure 13:
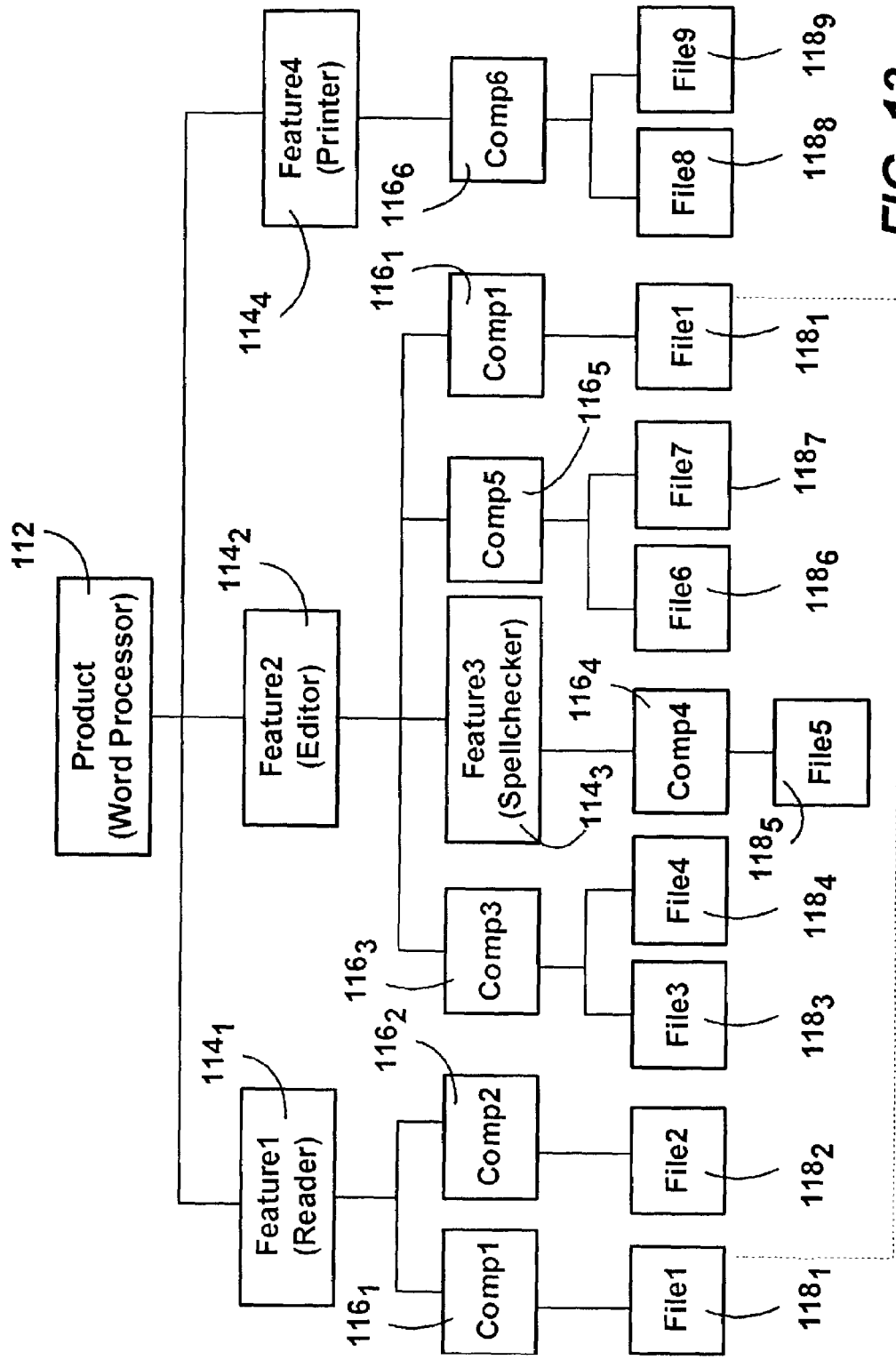
FIG. 13 is a block diagram representing how an application package may be hierarchically organized into features, components and files.

Although not necessary to the present invention, to improve installation, the installer 84b is arranged to divide applications into a three-level hierarchy, such as in the sample feature hierarchy shown in FIG. 13. At the top of the hierarchy is a product 112, which is an implementation that an administrator or end-user may install, e.g., a specific word processing application package such as Microsoft® Word. As further shown in FIG. 13, a product may be composed of multiple features such as the features $114_1$–$114_4$, wherein a feature is the smallest installable unit of functionality. Examples of features of a word processor are a reader $114_1$, Editor $114_2$, Spellchecker $114_3$, and Printer $114n$. A feature is something an administrator/user may choose to install or not, and thus somewhat corresponds to a checkbox in the "Custom" or "Advanced" installation dialog of a conventional installation mechanism.

Features in turn comprise one or more components such as $116_1$–$116_6$, wherein a component is the smallest unit of sharing among products and features. For example, a component such as component1 $116_1$ may be shared by both the Reader feature $114_1$ and the Editor feature $114_2$. Only one copy of the corresponding file 118$_1$ (e.g., a DLL) is actually installed, but that copy is installed if either Feature1 or Feature2 is installed. Note that while FIG. 13 shows components composed of files 118$_1$–118$_9$, components are the actual contents of a product, and may be composed of files, registry entries, COM registration information, Visual Basic type libraries, shortcuts, (e.g. for the Windows Start menu), and so on.

While features are specific to a product and identified by a name unique only within the product (e.g. "Reader"), components are global across all products installed on a machine and are identified by a GUID. Note that although COM components are also uniquely identified by a GUID and may be encapsulated as an installer component, an installer component is not related to COM. An installer component 116 is monolithic, i.e. it is either entirely installed on a machine or not installed at all. Because installer component identifiers are global, they are shared across products.

By way of example, a number of products ship the Microsoft Visual Basic for Applications (VBA) runtime. Defining VBA as an installer component 116 provides advantages, including that the installation logic for VBA can be encapsulated within the component 116, so all products which install VBA will install and uninstall it in exactly the same way. Also, once VBA is installed on a machine, the managed software installer mechanism 84 knows that VBA is there, and installation of subsequent products which use this component simply increase an installation reference count of the component, i.e., the products share the same copies of the files. Moreover, since the managed software installer mechanism 84 manages the installed components, it operates properly when a product is uninstalled, i.e., the reference count ensures that the mechanism does not remove components shared by products remaining on the machine.

Figure 14:
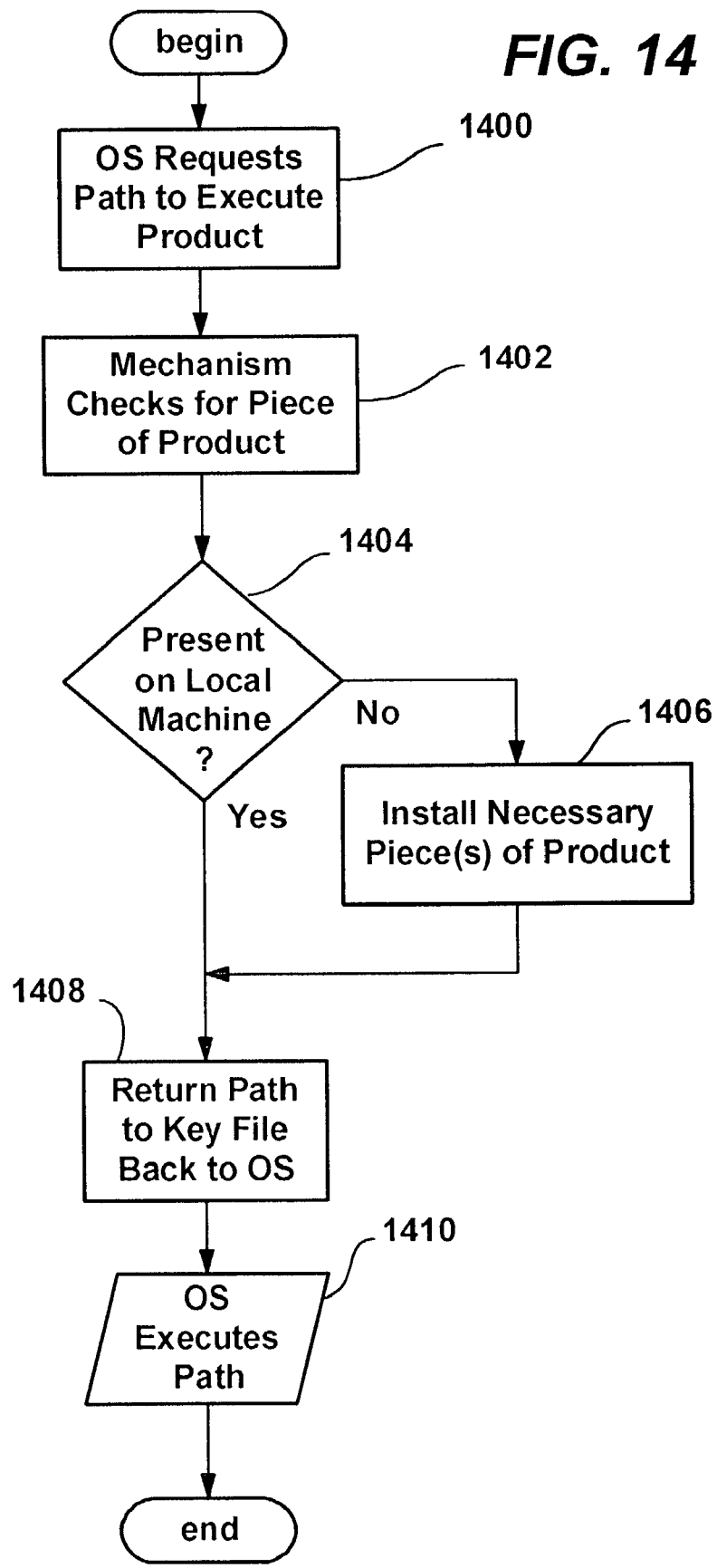
FIG. 14 is a flow diagram generally representing the steps taken by an operating system when a software implementation needs to be installed.

FIG. 14 shows how the operating system/OLE requests a full component path that may result in the on-demand installation of components and/or features as needed, such as by using the MsiProvideComponentFromDescriptor API set forth below. In general, a descriptor is a token representing a product code/feature name/component GUID. First, the operating system calls the API at step 1400, requesting a full component path. In turn, the API (via the MsiUseFeature API, described below) checks the local machine at step 1402 to detect that the components that make up that feature are installed. Note that the API only installs one feature, i.e., the one that was requested, however, if there are "ancestors" of that feature in the feature hierarchy defined in the package, those are also installed (if not already installed). In other words, a given feature may not be installed if its parent is not also installed. Likewise, when verifying that all of the components in the feature are valid, the components in all ancestor features are also verified. In any event, if not installed, step 1404 branches to step 1406, to install (via the MsiConfigureFeature API, also described below) the needed piece or pieces of the product. Lastly, step 1408 obtains the path to the key file via the MsiGetComponentPath API, also described below) and returns it to the operating system, which then executes that path at step 1410.

Figure 15A:
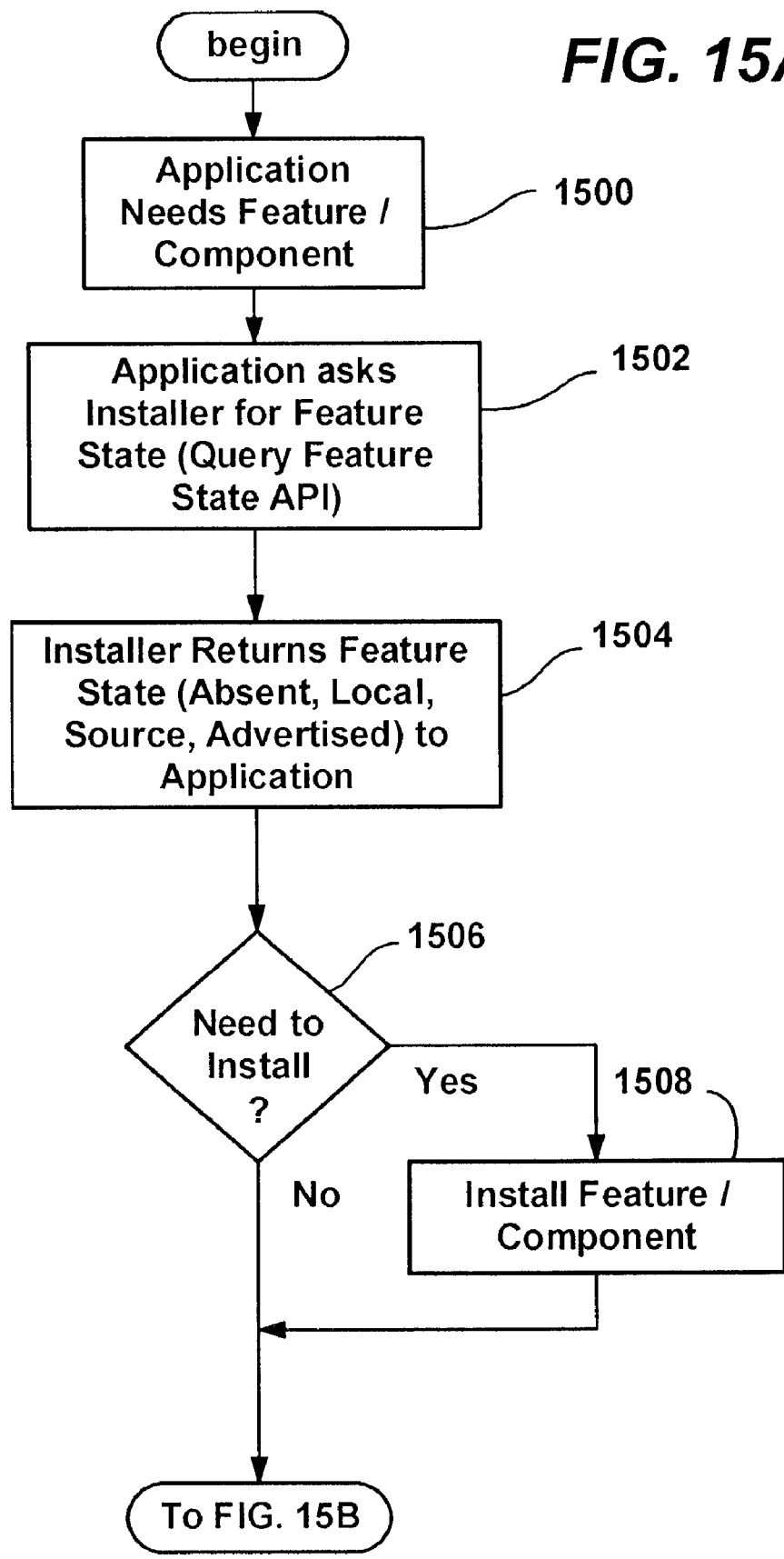
FIGS. 15A–15B comprise a flow diagram generally representing the steps taken by an application to request installation of an implementation needed thereby.
Figure 15B:
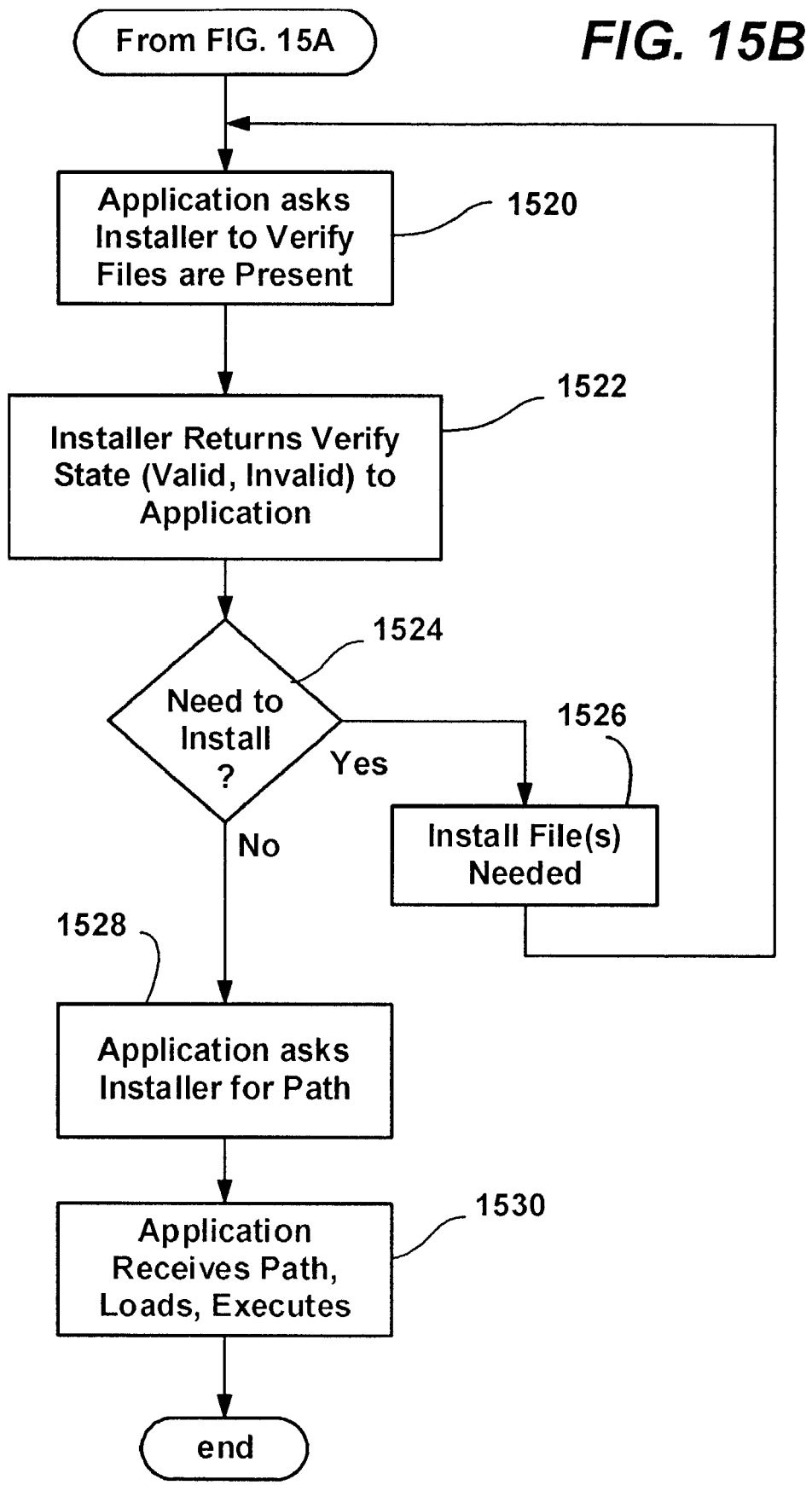

Turning to an explanation of how an application may interface with the managed software installer mechanism 84, FIGS. 15A–15B generally represent the steps taken by the application 98 and installer 84 (FIG. 11) to provide on-demand installation of features and components. First, at step 1500 of FIG. 15A, the application 98 determines that it needs a feature or component, (or at least state information regarding same). At step 1502, using the QueryFeatureState API, (described below), the application 98 requests the state of the feature or component from the installer. The state may be Absent, i.e., intentionally turned off by the user or administrator, and thus should not be installed by the application. Otherwise, the state may be Local (locally installed), Source (residing on a source media such as a network drive), or Advertised, (not installed but may be installed from the source when first needed). Based on the state, step 1506 determines whether the feature or component needs to be installed, i.e., it is not locally installed, but now it is needed and is proper for local installation. Step 1508 represents the installation on demand.

Step 1520 (FIG. 15B) is next executed, wherein the application 98 requests the installer 84 to verify that the needed files are present. To this end, the MsiUseFeature API is called. In general, the MsiUseFeature API does two things, i.e., verifies that the feature is intact, and increments the usage count (the usage count is the number of times that the user or application has used the feature). Note also that, if the feature is installed as run-from-source, (e.g., from the network or CD-ROM), part of the verification that the feature is intact involves finding a valid source. At step 1522, a verify status of valid or invalid is returned, whereby step 1524 branches to step 1526 to install needed files if the status is invalid. Note that until valid, step 1526 may keep returning to step 1520 to request verification, some number of times before failing (not shown). However, if the verification returns valid status, at steps 1528–1530, the application 98 requests and receives the path from the installer 84 and loads/executes it as appropriate.

In this manner, applications may repair themselves such as by installing missing or damaged components or files. Applications may avoid errors by checking with the installer 84 before making assumptions about what is installed on a machine at a given time. Missing features and components will be automatically installed by the installer mechanism whenever possible (and if allowed).

The Windows Installer (MSI) APIs

The following describes some of the MSI APIs utilized for on-demand installation of software implementations, wherein the "%" symbol represents ANSI (A) and Unicode (W) versions. MsiGetProductCode returns the product code for a registered component, i.e., this API returns information on the product that installed an application:

```
UINT WINAPI MsiGetProductCode%(
    LPCSTR% szComponent, // component ID registered for this product
    LPSTR% IpBuf39); //returned string GUID, sized for 39 characters
```

With the product code, the application may check its features, one by one, on an as needed basis, using MsiQueryFeatureState(ProductCode, FeatureID):

```
INSTALLSTATE WINAPI MsiQueryFeatureState%(
    LPCSTR% szProduct,
    LPCSTR% szFeature)
```

In this manner, an application may, for example, set itself to display appropriately available features and hide or otherwise indicate (e.g., visually gray out) those that are not available. To check features, the application calls MsiQueryFeatureState (ProductCode, FeatureID) using the product code returned in MsiGetProductCode( ) and the Feature ID of interest. As generally described above, if the return state is INSTALLSTATE_UNKNOWN or INSTALLSTATE-_ABSENT, the feature is not available, and for example, should not be displayed in a user interface. For example, if the spellcheck feature is turned off by an administrator, it should not appear available to the user. Note that a feature that is absent is still technically available, although an application may choose to treat it as unavailable, as it implies that the user has indicated that the user wanted to make the feature go absent. However, if the return value is INSTALLSTATE_ADVERTISED, the feature has been advertised/published and is available. If the return value is INSTALLSTATE_SOURCE or INSTALLSTATE_LOCAL then the feature has been installed. Lastly, if the return value is INSTALLSTATE_SOURCEABSENT (the feature is installed to SOURCE, but the source is unavailable, e.g., the network is down). Note that MsiQueryFeatureState will not return this, only the "installed" state of the feature, however MsiUseFeature may return this state.

A management tool, for example, may enumerate the published features for a given product by calling MsiEnumFeatures:

```
UINT WINAPI MsiEnumFeatures %(
LPCSTR% szProduct,
DWORD iFeatureIndex, // zero based index into published features
LPSTR% lpFeatureBuf, //feature name buffer, size =
MAX_FEATURE CHARS+1
LPSTR% lpParentBuf); //parent feature buffer, size =
MAX_FEATURE_CHARS+1
```

To request and install a feature, the following procedure may be used:

Call MsiUseFeature, passing in the ProductCode and FeatureId

If the return code is INSTALLSTATE_LOCAL or INSTALLSTATE_SOURCE, proceed down the hierarchical "pyramid" of code.

If the return code is INSTALLSTATE_UNKNOWN or INSTALLSTATE_ABSENT, an error occurred, since MsiQueryFeatureState should first be called to ensure that only features known to be available are requested.

If the return code is INSTALLSTATE_ADVERTISED, call MsiConfigureFeature, passing in the ProductCode, FeatureId and INSTALLSTATE_DEFAULT.

The following are return states from MsiUseFeature:

INSTALLSTATE_UNKNOWN: the product/feature is not known

INSTALLSTATE_ABSENT. the feature is in the absent state

INSTALLSTATE_ADVERTISED: the feature is in the advertise state

INSTALLSTATE_SOURCE: the feature is install run-from-source and a valid source is available INSTALLSTATE_SOURCEABSENT: the feature is install run-from-source and a valid source is not available INSTALLSTATE_LOCAL: the feature is installed locally and the components that comprise the feature (and its parents) are all intact INSTALLSTATE_BROKEN the feature is installed locally and the components that comprise the feature (and its parents) are not all intact (one or more keyfiles are missing)

Note that the above algorithm is one possible way to treat the return values from MsiUseFeature, but not the only way. For example, (although not preferable) an application could choose not to use MsiQueryFeatureState, but could simply use the return value from MsiUseFeature to determine whether a feature was usable or not.

MsiUseFeature indicates an intent to use a product feature and increments the usage count therefor:

```
INSTALLSTATE WINAPI MsiUseFeature%(
LPCSTR% szProduct,
LPCSTR% szFeature)
```

MsiConfigureFeature forces the installed state for a product feature:

```
UINT WINAPI MsiConfigureFeature %(
LPCSTR% szProduct,
LPCSTR% szFeature,
INSTALLSTATE eInstallState),
//local / source / default / absent / lock / uncache
```

An alternative to MsiConfigureFeature is MsiConfigureFeatureFromDescriptor, useful for making templates, add-ins and Access wizards more resilient. MsiConfigureFeatureFromDescriptor is essentially the same as MsiConfigureFeature, but takes a descriptor (token) rather than separate product and feature parameters:

```
UINT WINAPI MsiConfigureFeatureFromDescriptor %(
LPCSTR% szDescriptor,
INSTALLSTATE eInstallState), //local / source / default / absent
```

Once an application has requested a feature, it may perform its usual operations such as loading DLLs, opening data files and so on. However, as long as the application first asks where the file is located, dynamically loading DLLs should not fail for DLLs that are the key file of a component. The general information for accessing a file is set forth below:

Call MsiGetComponetPath, passing in the component ID and other appropriate parameters.

If the return code is INSTALLSTATE_ABSENT, then MsiUseFeature/MsiConfigureFeature was not properly called.

If the return code is INSTALLSTATE_UNKNOWN, then the component is not installed/known.

If the return code is INSTALLSTATE_DEFAULT, then the call was successful. (see the return values for MsiGetComponentPath. We never return INSTALLSTATE_DEFAULT. INSTALLSTATE_LOCAL and INSTALLSTATE-_SOURCE imply success).

If the return code is INSTALLSTATE_SOURCE_ABSENT (see above), then, for example, the network has gone down, or a CD-ROM is not loaded in the appropriate drive, whereby resiliency procedures should be invoked.

A fully qualified key file should be returned, and parsing may be needed such as if a file that is not the key file is desired.

In certain situations, i.e., when accessing a folder, a path is returned without a key file. Also, if the "key file" is a registry key or value then the registry key or value will be returned instead of a path to a file.

The following sets forth the return values for MsiGet-ComponentPath:
- INSTALLSTATE_NOTUSED: The component being requested is disabled on the computer.
- INSTALLSTATE_ABSENT: The component is not installed.
- INSTALLSTATE_BAD_CONFIGURATION: The configuration data is corrupt.
- INSTALLSTATE_INVALIDARG: One of the function parameters is invalid.
- INSTALLSTATE_LOCAL: The component is installed locally.
- INSTALLSTATE_SOURCE: The component is installed to run from source.
- INSTALLSTATE_SOURCEABSENT: The component source is inaccessible.
- INSTALLSTATE_UNKNOWN: The product code or component ID is unknown.

MsiGetComponentPath is a registry lookup that returns the full path to an installed component:

```
INSTALLSTATE WINAPI MsiGetComponentPath %(
LPCSTR% szProduct, // product code for client product
LPCSTR% szComponent, // component ID, string GUID
LPSTR lpPathBuf, // returned path
DWORD *pcchBuf) in / out buffer character count
```

A typical method is to call MsiGetComponentPath after performing the feature request steps set forth above. An alternative is to call MsiProvideComponent, which bundles three APIs (MsiUseFeature, MsiConfigureFeature, MsiGetComponentPath) into one. MsiProvideComponent returns the full component path, performing any necessary installation. As described with reference to FIG. 8, MsiProvideComponent and MsiProvideComponentFromDescriptor call MsiUseFeature to detect that components are installed, calls MsiConfigureFeature if any of its components are uninstalled, and then calls MsiGetComponentPath to obtain the path to its key file:

```
UINT WINAPI MsiProvideComponent %(
LPCSTR% szProduct, // product code in case install required
LPCSTR% szFeature, // feature ID in case install required
LPCSTR% szComponent, // component ID
DWORD dwReserved //reserved, must be zero
LPSTR% lpPathBuf, // returned path, NULL if not desired
DWORD *pcchBuf) in / out buffer character count
```

MsiProvideComponentFromDescriptor is essentially the same as MsiProvideComponent, but uses a descriptor instead of the product/feature/component identifiers:

```
UINT WINAPI MsiProvideComponentFromDescriptor %(
LPCSTR% szDescriptor // product, feature, component information
LPSTR% lpPathBuf, // returned path, NULL if not desired
DWORD *pcchBuf) in / out buffer character count
DWORD *pcchArgsOffset) returned offset of args in descriptor
```

This API, and MsiInstallMissingFile, below, are final, alternative attempts to fault in a feature, given a component or filename. It is expected that an application developer will attempt to use the other APIs to fault in features, but this may not always be possible. As a result, it is anticipated that such developers may benefit via these APIs.

To recover from a missing component error (following a call to MsiLocateComponent), a missing component may be reinstalled by MsiInstallMissingComponent, checking for a return code of ERROR_SUCCESS and then calling MsiLocateComponent again:

```
UINT WINAPI MsiInstallMissingComponet %(
LPCSTR% szProduct, // product code
LPCSTR% szComponent, // component ID, string GUID
INSTALLSTATE eInstallState), //local / source / default / absent invalid
```

To recover from a missing file error (i.e., an application has failed in an attempt to open a file) the general procedure of calling MsiInstallMissingFile, checking for a return code of ERROR_SUCCESS and then re-trying the file I/O operation:

```
UINT WINAP1 MsiInstallMissingFile %(
LPCSTR% szProduct, // product code
LPCSTR% szFile); // filename without path
```

On Demand Patching

The present invention is generally directed to the on-demand patching of application programs, since in general, updating application programs is the primary usage of patching technology. Thus, for purposes of simplicity, the following example and accompanying drawings (FIGS. 16–20) will refer to patching an application. Notwithstanding, as will be understood, virtually any software implementation that may be installed may also be patched in accordance with the present invention, and there is no intention to limit the present invention to application programs.

Figure 16:
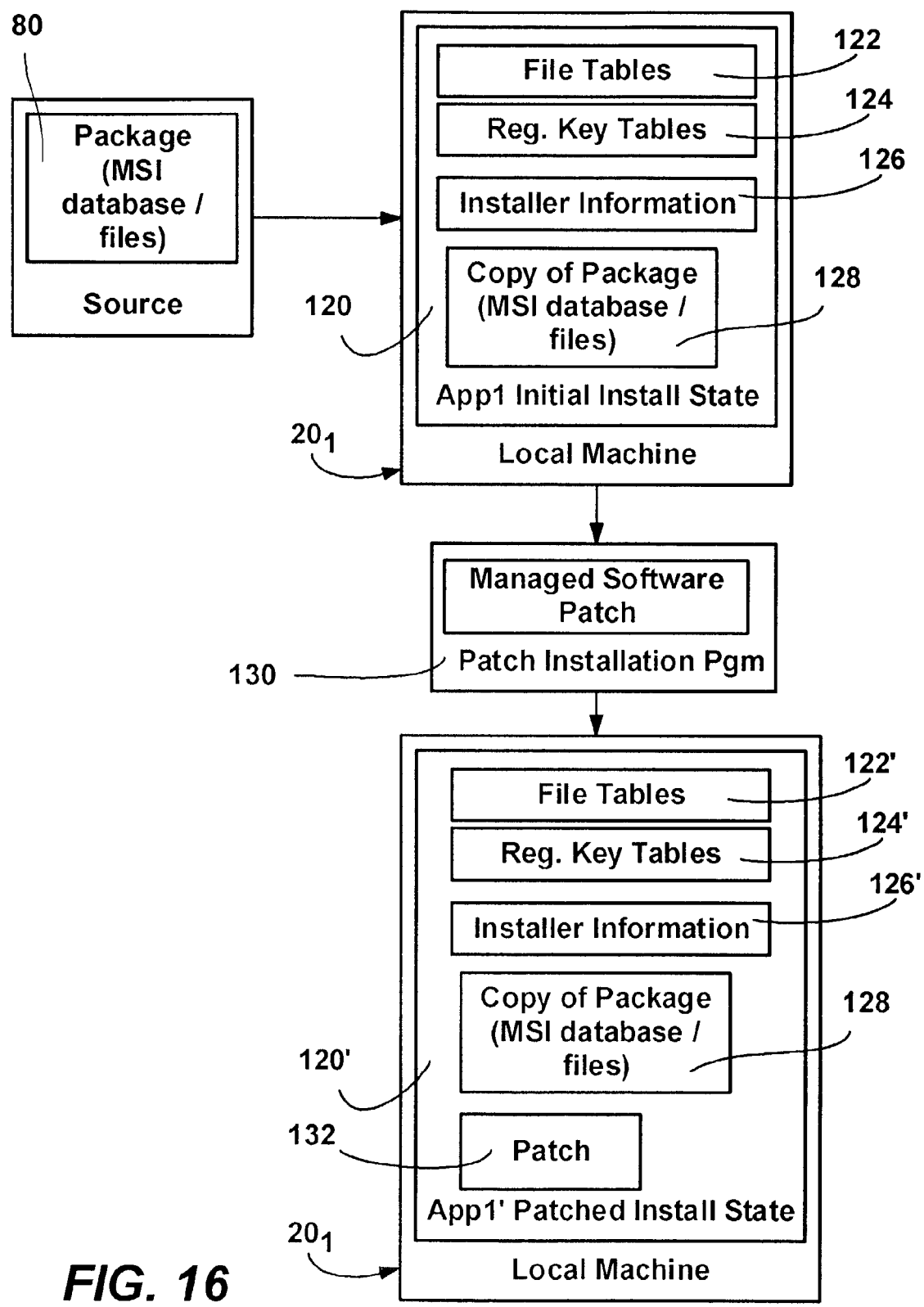
FIG. 16 is a block diagram representing how a local machine changes from an initial installed state of an application to a patched application installed state in accordance with one aspect of the present invention.

As shown in FIG. 16, once an application (e.g., APP1) is advertised and/or installed, the initial install state 120 of the application is maintained on the local machine $20_1$ (e.g., in the registry 74) and is thus available to the managed software installer mechanism 84b as described above. Note that although referred to as "install" state information, the information may indicate that the application is not yet installed. As shown in FIG. 16, the initial install state information 120 includes information such as a list of files (e.g., in a table 122) that should be installed for the application, and registry keys and the values therefor (e.g., in a table 124). Also maintained by the installer 84b is information 126 that is specific to this particular installation, such as which options the user has selected for installing, e.g., which of several available templates, if any, the user wants to have available with the application. Further, although primarily maintained locally for performance reasons, a copy 128 of the application package 80 is maintained as a file on the local machine $20_1$, e.g., in a folder that is private to the installer mechanism 84b. The information maintained by the installer mechanism 84b includes a local path to the application package 128, and possibly includes one or more paths to other copies thereof (e.g., the network share).

When the user (or administrator) wishes to install a patch, the user downloads and/or otherwise runs an executable patch installation program 130 (FIG. 16). In keeping with the present invention, patch information, maintained in a managed software patch 132, (i.e., the patch), is maintained by the installer 84b as install state information 120' for the application APP1', (wherein the prime "'" designation is used herein to indicate a change as a result of a patch). Thereafter, whenever the installer 84b is called to perform an installation operation for the application, e.g., install the application on demand, verify and as necessary fix the application files, and so forth, the installer mechanism 84b uses the patched install state information 120' as the basis for determining what files, registry settings and so on the application should have installed therefor. Note that a patch may be created that neither touches files nor registry key, i.e., a patch that has no additions, modifications or deletions involving files or registry keys, shortcuts, and so forth. For example, such a patch might only change some of the installation logic, such as the user interface that gets displayed, e.g., a simple patch of this type might change the text in the License Agreement that appears on the first screen when a user clicks on setup.

Figure 17:
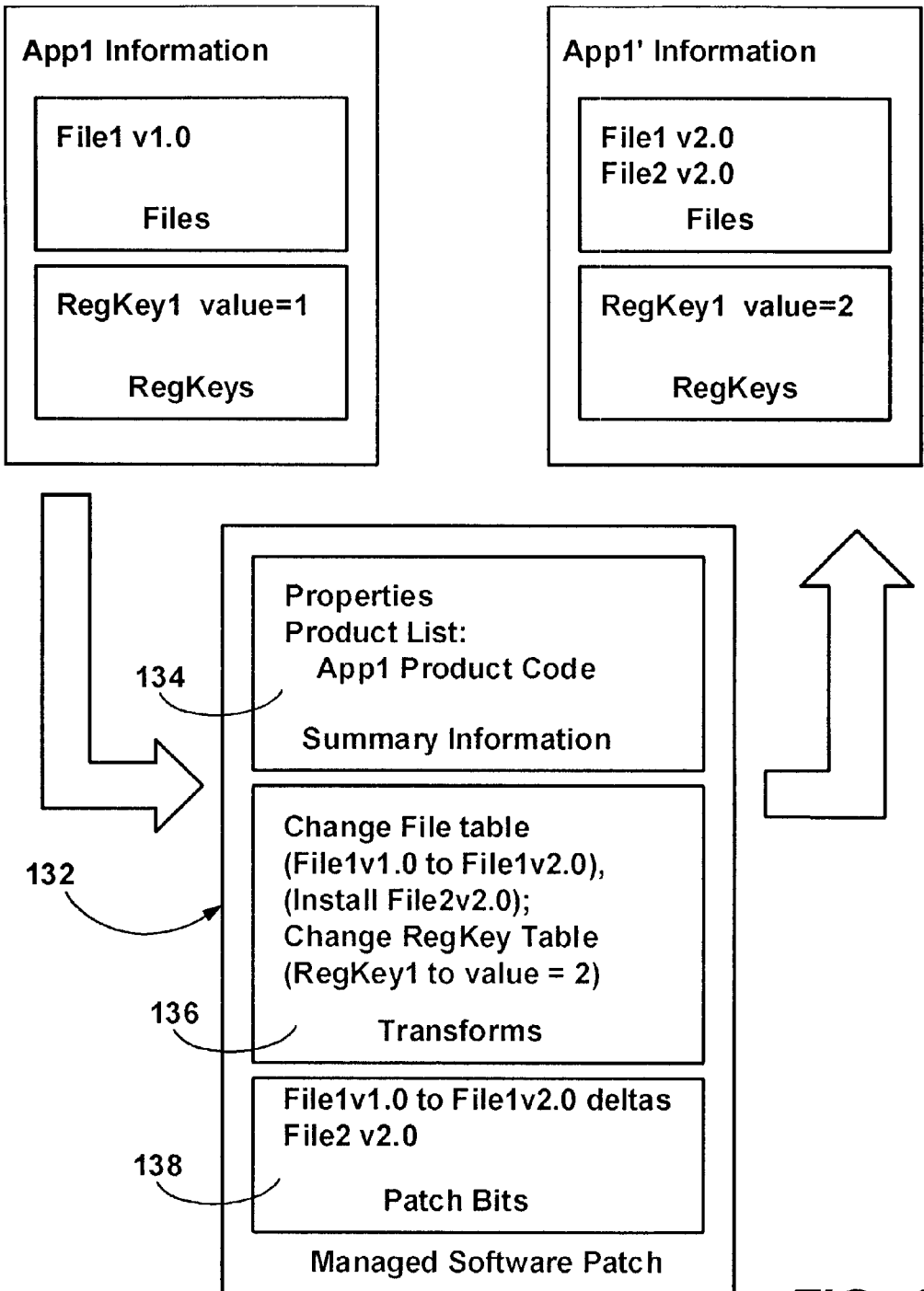
FIG. 17 is a block diagram representing how a patch changes installed applications in accordance with one aspect of the present invention.
Figure 18:
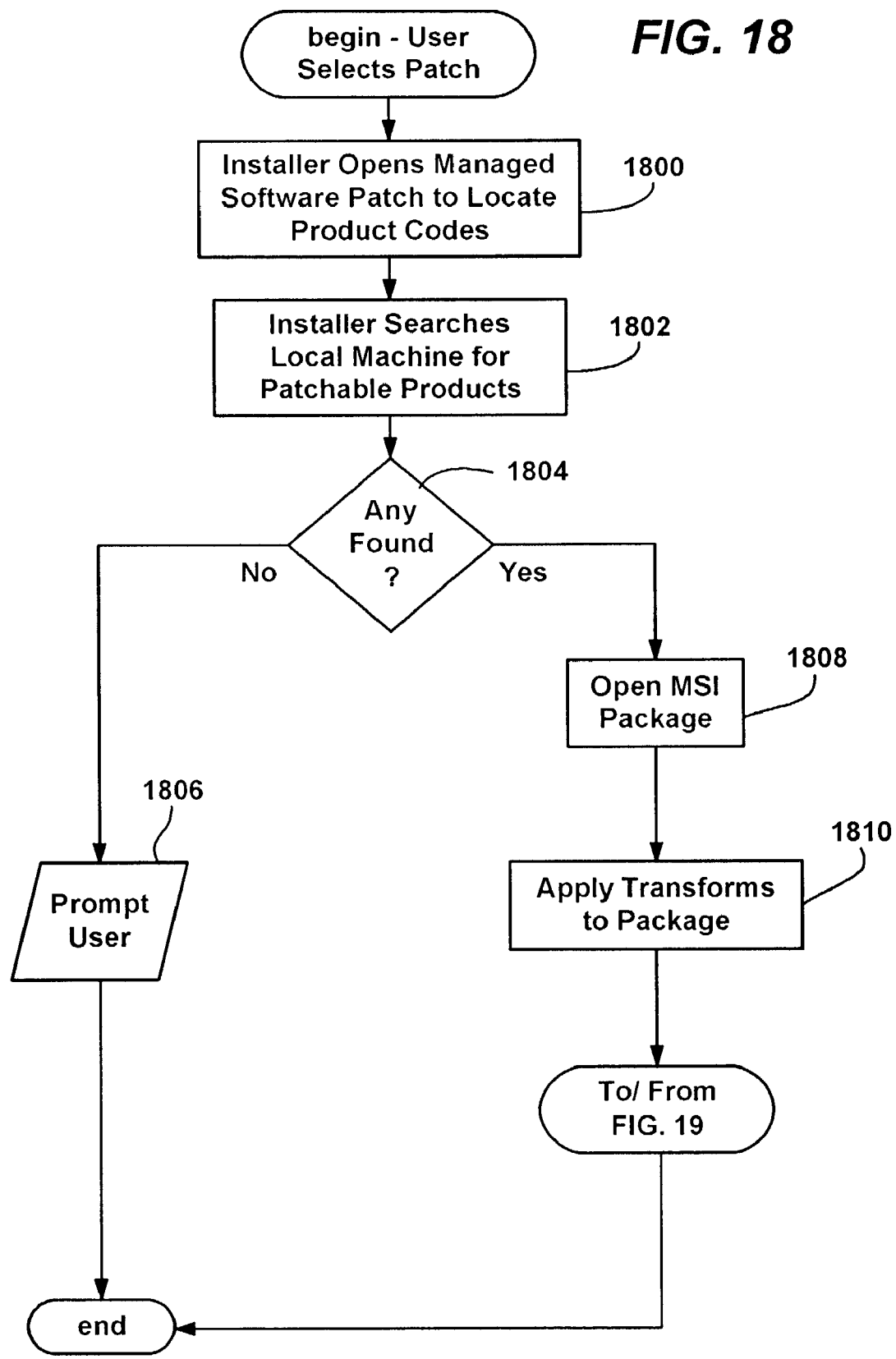
FIG. 18 is a flow diagram generally representing the steps taken when a user requests patching of an application in accordance with an aspect of the present invention.
Figure 19:
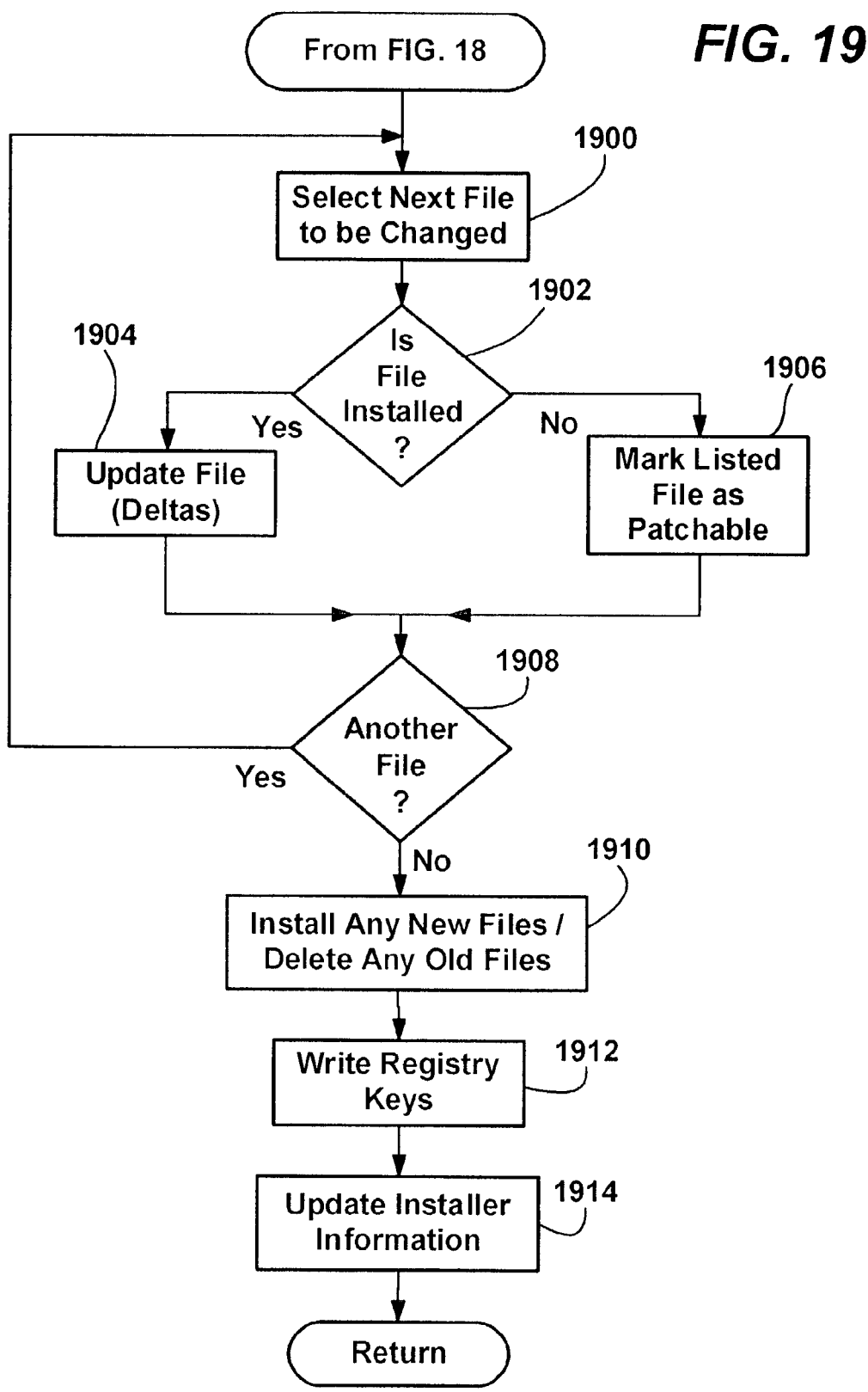
FIG. 19 is a flow diagram generally representing the steps taken when a patch is applied to an application in accordance with an aspect of the present invention.

As represented in FIG. 17, the patch 132 includes summary information 134 such as properties, including a list of one or more applications (i.e., as identified by product code) to which the patch 132 can be applied. For example, a patch may be prepared for a suite of applications, whereby the patch may be able to patch any of the applications in the suite even if the user has less than the full amount of applications advertised or installed. Moreover, a patch may be arranged to patch two or more earlier versions of applications, for example, a patch release 2.0 that can patch application X or application X' (patched with release 1.0). In any event, the summary information 134 informs the installer 84b as to which applications the patch 132 applies.

The patch 132 also includes one or more transforms 136, which essentially modify the results of running the initial advertise script 82 in the initial install package 80, so as to inform the installer 84b as to what changes are to be implemented by the patch 132. For example, transforms may instruct the installer 84b to install new files for this application, delete certain others, and change selected others. The patch 132 also typically includes "patch bits" 138, comprising the various new files and/or change information (file bits comprising the deltas) needed by the transforms 136. These patch bits 138 may be compressed into cabinet files or the like as desired.

By way of example, FIG. 17 shows how an application, APP1, is to be changed by a patch 132 into a patched application, APP1'. In FIG. 17, the application APP1 initially has the file "File1, version 1.0" associated therewith, (along with possible many other files, not listed). Also, the application APP1 has an entry for writing in the registry 74 with a value of one, (RegKey1's value equals one). After patching, the application APP1' should have "File1, version 2.0" and "File 2, version 2.0" for its associated files, and a new value for RegKey1 equal to two, as shown in the patch-adjusted APP1' information. To accomplish the change, the patch 132 includes transforms 136 that essentially instruct the installer 84b to change the files (e.g., when installed) such that File1 version 1.0 will be changed to File1 version 2.0, and such that File2 version 2.0 will be installed. Similarly, the RegKey1 value will be changed to two. The patch 132 also includes the various file bits 138 necessary to change File1 from version 1.0 to version 2.0, and also includes the file named File 2 (version 2.0).

In keeping with the present invention, the files are not necessarily changed (or installed) until needed, i.e., the patching may take place on demand. For example, an application that is advertised, but not installed, may be patched, but the patching need not take place until installation. To this end, as described below with reference to FIGS. 18 and 19, changes are made to only files that are already installed. Those that are not yet installed will be changed when they are installed.

Turning to an explanation of the operation of the present invention, when a patch installation program 130 is first run, at step 1800, the installer 84b opens the managed software patch 132 within (or associated with) the program 130 to locate the product codes in the summary information 134. Then, as represented by step 1802, the installer 84b searches the local machine for products that are identified therein. Note that both assigned and published applications may be patched, even if not installed, as well as any other applications that are installed on the machine. If none are found, step 1804 branches to step 1806 to inform the user that the patch is not appropriate for this machine.

At step 1804, if at least one patchable application is found, the installer 84b, via step 1808, opens the local copy 128 of the package 80, and at step 1810 applies the transforms 136 to the package. In essence, the installer 84b is modifying the tables 122', 124'in view of the patch 132, and continues to step 1900 of FIG. 19.

The transforms 136 may instruct the installer 84b to update certain files. However, because of the ability of the installer 84b to perform on-demand installation, those files need not be installed on the local machine at this time. Thus, beginning at step 1900, the installer 84b walks through the list of files 122' to determine at step 1902 whether each file identified for changing is presently installed. If installed, the installer 84b causes the file to be updated, for example the installer 84b calls a change engine or the like, passing the old file and the change information, whereby the change is made. Such change engines are well known in patching, and thus are not described in detail herein. If not installed (step 1902), the listed file is marked at step 1906, e.g., a certain bit is set therefor, to indicate that the file is patchable and should be updated whenever the installer 84b installs it. Step 1908 repeats the process until the listed files are either updated or marked for updating.

Step 1910 is then executed to install any new files and/or delete any existing files as set forth in the transforms 136. Note that installation of the new files may also be deferred by marking them for install rather than installing, such as if the key files of the application are not yet installed. This may be made dependent on other factors, e.g., the size of the file, whether another, installed application may benefit from the new file and so on. Also, note that if the transforms designate a file for deletion, but that file is still needed by another application, a reference count or the like associated with that file may instead be adjusted. Step 1912 writes any registry key changes to the registry, such as to advertise the application as available, e.g., write any new file extensions to the registry so that the application will be activated when such an extension is clicked on. Lastly, step 1914 updates the installer information 126 that is specific to this install as modified by the patch (although some or all of the actual installation may not have taken place).

In accordance with an aspect of the invention, once patched, the patching occurs on-demand for applications and the like that are not yet installed. To this end, whenever an application is installed on demand, (as described above with reference to FIGS. 8 and 10), if it has been patched, the installer 84b also automatically patches the application on demand. FIG. 20 shows how this is accomplished, i.e., in a manner similar to FIG. 19 except that since the application is installed at this time, there is no marking of files for later installation. Thus, after the regular installation, step 2000 selects the files to be updated, including those marked as patchable, and step 2002 updates the files, e.g., sends the necessary information to a change engine. Step 2004 repeats the process until the files-to-be changed are updated. Steps 2008–2012 are analogous to steps 1908–1912, described above, and ensure that the registry settings and installer information 126' are correct and current.

Note that a user may change the installed state of files on the machine (e.g., move, rename and delete), and/or cause the same files to be installed or patched via other applications. Thus, a file that is marked as patchable may have already been installed and/or patched. For example, a spreadsheet application may be patched, causing xyz.dll to be installed and patched (to xyz'.dll), whereby an advertised, patched but uninstalled word processing application that shares xyz.dll will not need to be patched when it is installed. However, since the installer is in charge of both the on demand installation and on demand patching, for efficiency, the installer knows not install a file that is already installed, or update a file that has been updated, and similarly knows not to install a file that is to be deleted by the patch. The installer 84b also verifies the correct installation state of a patched application, such as by executing steps analogous to steps 1002–1004 of FIG. 10 after each on demand install and/or patching operation. Also, to allow for the removal of a patch from an application, if the entire application is uninstalled, the patch will not be applied at the next install. Note that the patch is reapplied if parts of the application (e.g., features) are uninstalled and reinstalled.

As can be seen from the foregoing detailed description, there is provided a method and system for automatically patching applications on demand. Via a managed patch, the initial install state information is modified and supplemented, whereby the patch will properly be applied at each install, including an on-demand installation.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a client computer system, a method of patching a software implementation, comprising:
   receiving a patch corresponding to a software implementation at a client computer system;
   maintaining patch information in association with the software implementation at the client computer system;
   determining whether the software implementation is installed on the client computer system, and;
   if the software implementation is installed on the client computer system, automatically patching the software implementation, and
   if the software implementation is not installed on the client computer system, using the patch information to automatically patch the software implementation when the software implementation is later installed.

2. The method of claim 1 wherein determining whether the software implementation is installed on the computer system includes querying an installation service.

3. The method of claim 1 further comprising, installing the software implementation on demand, accessing the patch information maintained in association with the software implementation, and patching the software implementation on demand based on the patch information.

4. The method of claim 3 wherein patching the software application includes changing data in at least one file associated with the software implementation.

5. The method of claim 3 wherein patching the software application includes adding at least one file for association with the software implementation.

6. The method of claim 3 wherein patching the software application includes deleting at least one file associated with the software implementation.

7. The method of claim 3 wherein patching the software application includes writing at least one value to the system registry.

8. The method of claim 3 wherein patching the software application includes modifying at least one value in the system registry.

9. The method of claim 1 wherein the patch identifies at least one file of the software implementation to be changed, and further comprising, for each file to be changed, determining if the file is installed, and if installed, changing information in the file, and if not installed, maintaining information for the file indicating that the file is to be changed.

10. The method of claim 1 wherein receiving a patch corresponding to a software implementation comprises receiving patch information from an executing patch installation program.

11. The method of claim 1 wherein maintaining patch information comprises maintaining transform information and maintaining patch bits on the computer system.

12. A computer-readable medium having computer-executable instructions for performing the method of claim 1.

13. In a client computing environment, a method comprising:
   receiving a request related to patching a software implementation with patch data;
   determining whether the software implementation is already installed on a client computer system; and
   if the software implementation is already installed, patching the software implementation with the patch data and maintaining patch information in association with the software implementation such that if the software implementation is later reinstalled, the reinstalled software implementation will be automatically re-patched with the patch data upon reinstallatian of the software implementation; and
   if the software implementation is not already installed, maintaining patch information in association with the software implementation at the client computer such that if the software implementation is installed, the software implementation will be automatically patched with the patch data upon installation of the software implementation.

14. A computer-readable medium having computer-executable instructions for performing the method of claim 13.

15. In a client computer system, a mechanism for patching a software implementation, comprising, an interface that receives patch information corresponding to a software implementation, a storage configured to maintain the patch information, and an installer that determines whether the software implementation is installed on the client computer system, the installer patching the software implementation if the software implementation is installed on the client computer system, and, if the software implementation is not installed on the client computer system, the installer using the patch information to automatically patch the software implementation when the software implementation is later installed.

16. The mechanism of claim 15 wherein the patch information includes at least one new file to install for the software implementation.

17. The mechanism of claim 15 wherein the patch information identifies the software implementation by a product code.

18. The mechanism of claim 15 wherein the patch information includes instructions for changing at least one file associated with the software implementation.

19. The mechanism of claim 15 wherein the patch information includes data for changing at least one file associated with the software implementation.

20. The mechanism of claim 15 wherein the patch information includes instructions for changing at least one value associated with the software implementation in the system registry.

21. The mechanism of claim 15 wherein the patch information includes instructions for adding at least one value associated with the software implementation to the system registry.

22. The mechanism of claim 15 wherein the software implementation is not installed on the computer system, and wherein the installer receives a request to install the software implementation, installs the software implementation, accesses the patch information in the storage, and patches the software implementation based on the patch information.

23. A computer-readable medium having computer-executable instructions for permitting steps comprising:
   receiving a request to install a software implementation on a client computer, the software implementation not previously installed;
   installing at least part of the software implementation on the client computer
   in connection with at least part of the software implementation, automatically determining from patch information stored on the client computer and associated with the software implementation that the software implementation has a patch associated therewith; and
   automatically patching the software implementation.

24. The computer-readable medium of claim 23 wherein the software implementation is an advertised application that is advertised as available for execution prior to installation of application code used to execute the application.

25. The computer-readable medium of claim 23 wherein the software implementation is a published application that has no presence on a machine until invoked.

26. The computer-readable medium of claim 23 having further computer-executable instructions for receiving the patch, and maintaining the patch in association with the software implementation.

27. The computer-readable medium of claim 23 wherein patching the software implementation includes changing data in at least one file of the software implementation.

28. The computer-readable medium of claim 23 wherein patching the software implementation includes adding at least one file to the software implementation.

29. The computer-readable medium of claim 23 wherein patching the software implementation includes deleting at least one file of the software implementation.

30. The computer-readable medium of claim 23 wherein patching the software implementation includes replacing at least one file of the software implementation.

31. The computer-readable medium of claim 23 wherein patching the software implementation includes writing a value to a registry entry associated with the software implementation.

32. The computer-readable medium of claim 23 wherein patching the software implementation includes modifying a value of a registry entry associated with the software implementation.

33. The computer-readable medium of claim 23 wherein patching the software implementation includes changing installation logic of the software implementation.

* * * * *